(12) United States Patent
Fujii et al.

(10) Patent No.: US 9,353,223 B2
(45) Date of Patent: May 31, 2016

(54) POLYAMIC ACID, POLYIMIDE, POLYAMIC ACID SOLUTION, AND USE OF POLYIMIDE

(71) Applicant: KANEKA CORPORATION, Osaka (JP)

(72) Inventors: Mari Fujii, Shiga (JP); Shinji Ozawa, Shiga (JP); Tomohiro Abo, Shiga (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 14/409,126

(22) PCT Filed: Jun. 25, 2013

(86) PCT No.: PCT/JP2013/067370
§ 371 (c)(1),
(2) Date: Dec. 18, 2014

(87) PCT Pub. No.: WO2014/007112
PCT Pub. Date: Jan. 9, 2014

(65) Prior Publication Data
US 2015/0183931 A1    Jul. 2, 2015

(30) Foreign Application Priority Data

Jul. 2, 2012   (JP) ................................ 2012-148588

(51) Int. Cl.
| | |
|---|---|
| *C08G 73/10* | (2006.01) |
| *B29C 41/24* | (2006.01) |
| *C08G 73/16* | (2006.01) |
| *C08G 69/00* | (2006.01) |
| *C09D 179/08* | (2006.01) |

(52) U.S. Cl.
CPC ............ *C08G 73/1042* (2013.01); *C08G 69/00* (2013.01); *C08G 73/1053* (2013.01); *C08G 73/1082* (2013.01); *C08G 73/16* (2013.01); *C09D 179/08* (2013.01)

(58) Field of Classification Search
None
See application file for complete search history.

(56) References Cited

U.S. PATENT DOCUMENTS

| | | | |
|---|---|---|---|
| 2009/0088551 A1 | 4/2009 | Yamashita et al. | |
| 2013/0178597 A1 | 7/2013 | Takasawa et al. | |

FOREIGN PATENT DOCUMENTS

| | | |
|---|---|---|
| JP | 2002-161136 | 6/2002 |
| JP | 2005-306983 | 11/2005 |
| JP | 2006-206825 | 8/2006 |
| JP | 2007-091701 | 4/2007 |
| JP | 2009-079165 | 4/2009 |
| JP | 2010-80878 | 4/2010 |
| JP | 2010-235641 | 10/2010 |
| JP | 2012-041530 | 3/2012 |
| TW | 201012851 | 4/2010 |
| WO | 2012-011590 | 1/2012 |

OTHER PUBLICATIONS

International Search Report, PCT/JP2013/067370, Oct. 1, 2013.
International Preliminary Report on Patentability, PCT/JP2013/067370, Jan. 15, 2015.
English Translation of First Office Action, Taiwanese Application No. 102123045, dated Nov. 5, 2015 (9 pages).

*Primary Examiner* — Ana Woodward
(74) *Attorney, Agent, or Firm* — Kagan Binder, PLLC

(57) ABSTRACT

The object of the present invention is to obtain the polyimide and the polyamic acid excellent in heat resistance, low thermal expansion property, and transparency and achieve low birefringence and to provide a product or a member, demanded to have high heat resistance and transparency, by using the polyimide or the polyamic acid. In particular, the object is to provide a product and a member in which the polyimide or the polyamic acid of the present invention is formed on a surface of an inorganic substance such as glass, metal, a metal oxide, or a single crystal silicon. The objects are attained by introducing a rigid structure and an alicyclic structure into a skeleton and using a monomer having a fluorene skeleton together.

17 Claims, 1 Drawing Sheet

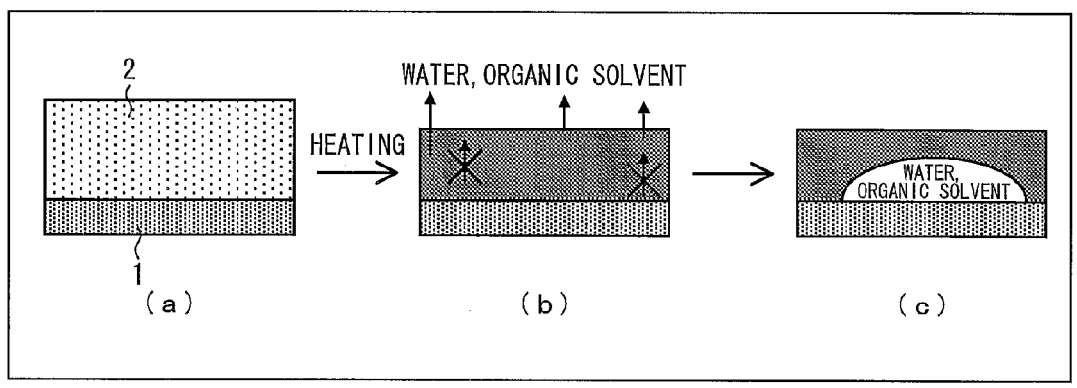

POLYAMIC ACID, POLYIMIDE, POLYAMIC ACID SOLUTION, AND USE OF POLYIMIDE

This application claims benefit from International Application No. PCT/JP2013/067370, which was filed on Jun. 25, 2013, which in turn claims priority to Japanese Application No. 2012-148588, which was filed on Jul. 2, 2012, wherein the entireties of said patent applications are incorporated herein by reference.

TECHNICAL FIELD

The present invention relates to a polyamic acid, a polyimide, and a polyamic acid solution. The present invention further relates to an electronic device material, a TFT substrate, a flexible display substrate, a color filter, a printed matter, an optical material, a liquid crystal display device, an image display device such as an organic EL and an electronic paper, a 3-D display, a solar cell, a touch panel, a transparent conductive film substrate, and an alternative material for a part which has conventionally been made of glass, each of which are made with the use of a polyimide.

BACKGROUND ART

In recent years, reduction in thickness, reduction in weight, and flexibility are demanded for devices in accordance with rapid progress of displays such as a liquid crystal display, an organic EL display, and an electronic paper, and of electronics such as a solar cell and a touch panel. Under the circumstances, instead of a glass substrate which is used in such devices, a plastic film substrate has been studied which can achieve reduction in thickness, reduction in weight, and flexibility.

In the devices, various electron elements, e.g., a thin film transistor and a transparent electrode are provided on a substrate, and it is necessary to carry out a high temperature process for forming the electron elements. Therefore, the plastic film substrate is required to have heat resistance sufficient for being applied to the high temperature process. Moreover, in a case where the electron elements, which are made of inorganic materials, are formed on a film, the film on which the inorganic devices have been provided may be curved and further the inorganic devices may be broken, due to a difference in linear thermal expansion coefficient between the film and the inorganic materials. Therefore, a material has been demanded which has (i) heat resistance and (ii) a linear thermal expansion coefficient equivalent to that of the inorganic material.

In a case where light from a display element (such as liquid crystal or organic EL) is emitted through a plastic film substrate (e.g., in a case of a bottom emission type organic EL), the plastic film substrate needs to have transparency. In particular, the plastic film substrate is requested to have a high optical transmittance in a visible light range, i.e., in a wavelength range of 400 nm or less. In a case where light passes through a retardation film and/or a polarizing plate (e.g., in a case of a liquid crystal display or a touch panel), the plastic film substrate is required to have high optical isotropy, in addition to transparency.

Processes for producing such devices are classified into a batch type and a roll-to-roll type. In a case where the roll-to-roll production process is used, it is necessary to prepare new equipment, and also necessary to overcome some problems caused due to rotation and contact. Meanwhile, in the batch type process, a coating resin solution, which has been applied to a glass substrate, is dried so as to be formed into a substrate, and then the substrate thus obtained is peeled off. As such, in the batch type process, conventional equipment for processing a glass substrate such as a TFT can be used, and is therefore advantageous in terms of cost.

Under the circumstances, development of a material has been strongly demanded which (i) is applicable to a conventional batch process and (ii) has high heat resistance, low thermal expansion property, excellent transparency, and low birefringence.

As a material which satisfies the above described requests, a polyimide material has been studied which is known as a material having excellent heat resistance. In a case of preparing a polyimide that is high in transparency and is low in thermal expansion property, a monomer having a rigid structure and an alicyclic monomer are generally used (see Patent Literature 1 and Patent Literature 2). Meanwhile, it is known that a polyimide having a fluorene structure shows heat resistance and a low water-absorbing property (Patent Literature 3).

CITATION LIST

Patent Literatures

[Patent Literature 1]
Japanese Patent Application Publication Tokukai No. 2002-161136 (Publication date: Jun. 4, 2002)
[Patent Literature 2]
Japanese Patent Application Publication Tokukai No. 2012-41530 (Publication date: Mar. 1, 2012)
[Patent Literature 3]
Japanese Patent Application Publication Tokukai No. 2009-079165 (Publication date: Apr. 16, 2009)

SUMMARY OF INVENTION

Technical Problem

The polyimide disclosed in Patent Literature 1 is excellent in heat resistance and low thermal expansion property but does not have sufficient transparency, and Patent Literature 1 is silent about birefringence. The polyimide disclosed in Patent Literature 2 is excellent in transparency and low thermal expansion characteristic but Patent Literature 2 is silent about birefringence. The polyimide containing a fluorene structure disclosed in Patent Literature 3 is excellent in heat resistance and low thermal expansion property but does not have sufficient transparency, and Patent Literature 3 is silent about birefringence.

The present invention is accomplished in view of the actual circumstances, and its object is to obtain (i) a polyimide which is excellent in heat resistance, low thermal expansion property, and transparency and shows low birefringence, and (ii) a polyamic acid as a precursor of the polyimide. Further, an object of the present invention is to provide, with the use of the polyimide and the polyamic acid, a product or a member which is highly requested to have heat resistance and transparency. In particular, an object of the present invention is to provide a product and a member in which the polyimide and the polyamic acid of the present invention are provided on a surface of an inorganic substance such as glass, metal, a metal oxide, and single crystal silicon.

Solution to Problem

The inventors of the present invention have found it effective to introduce a rigid structure and an alicyclic structure in a skeleton and to use also a monomer having a fluorene skeleton, in order to attain the object, i.e., to obtain the polyimide that is excellent in heat resistance, low thermal expansion property, and transparency and shows low birefringence, That is, a polyamic acid of the present invention contains a constitutional unit represented by General Formula (1) and a constitutional unit represented by General Formula (2):

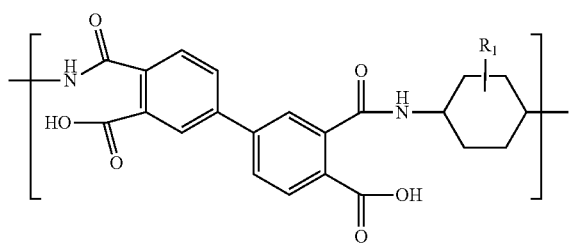

(1)

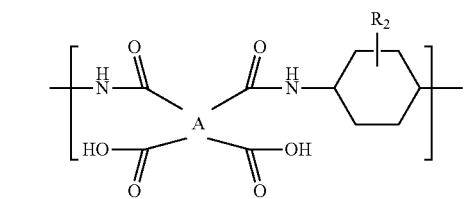

(2)

where, each of "$R_1$" and "$R_2$" is a group selected from a hydrogen atom, an alkyl group, a halogen atom, a hydroxyl group, a carboxyl group, and an alkoxyl group, "$R_1$" and "$R_2$" are identical with each other or different from each other, and "A" in General Formula (2) is an acid dianhydride-derived component which is one selected from a constitutional unit represented by Formula (3), a constitutional unit represented by Formula (4), and a constitutional unit represented by Formula (5):

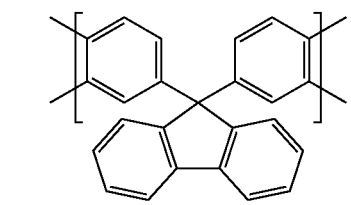

(3)

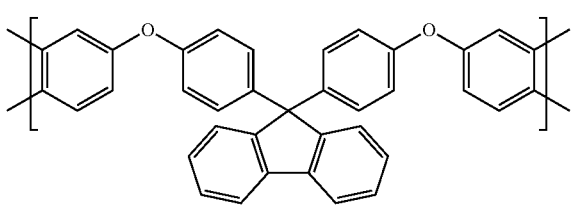

(4)

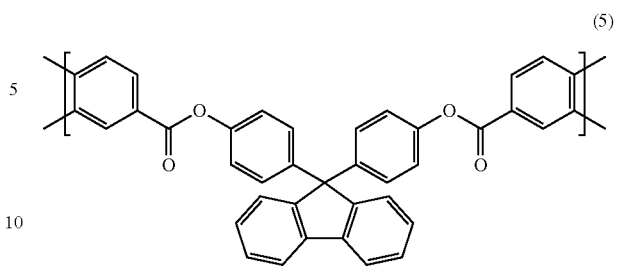

(5)

A polyimide of the present invention contains a constitutional unit represented by General Formula (6) and a constitutional unit represented by General Formula (7):

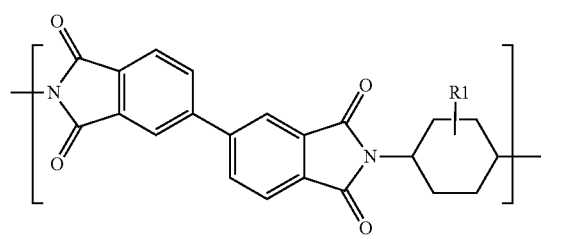

(6)

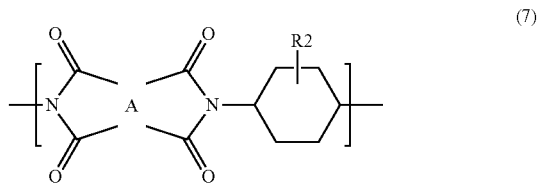

(7)

where, each of "R1" and "R2" is a group selected from a hydrogen atom, an alkyl group, a halogen atom, a hydroxyl group, a carboxyl group, and an alkoxyl group, "R1" and "R2" are identical with each other or different from each other, and "A" in General Formula (7) is an acid dianhydride-derived component which is one selected from a constitutional unit represented by Formula (3), a constitutional unit represented by Formula (4), and a constitutional unit represented by Formula (5):

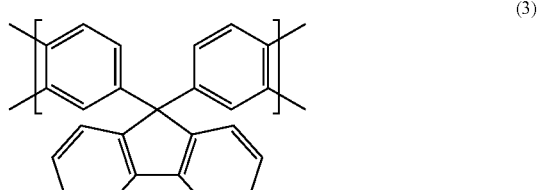

(3)

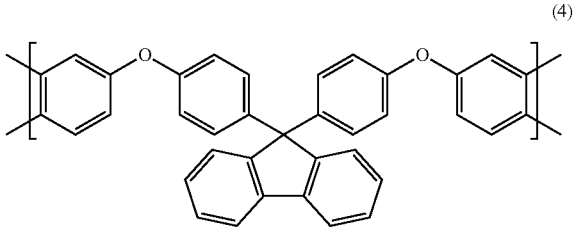

(4)

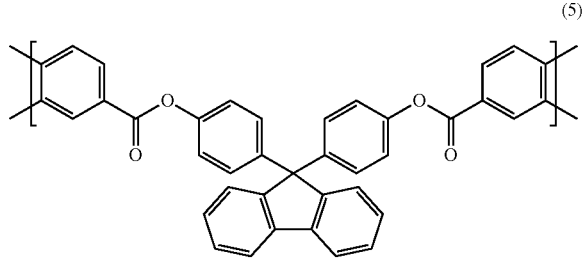

Advantageous Effects of Invention

The polyimide of the present invention and the polyimide prepared with the use of the polyamic acid of the present invention have low birefringence, in addition to heat resistance, low thermal expansion property, and transparency. Therefore, the polyimide of the present invention and the polyamic acid of the present invention are suitable for a film or a coating for a member that is required to have low birefringence, in addition to heat resistance, low thermal expansion property, and transparency.

BRIEF DESCRIPTION OF DRAWINGS

FIG. 1 is a view schematically illustrating a state in which detachment or floating occurs between a polyimide and a support when a polyamic acid solution applied to the support is imidized.

DESCRIPTION OF EMBODIMENTS

The following description will discuss the present invention in detail.

The polyamic acid prepared in the present invention contains a constitutional unit represented by General Formula (1) and a constitutional unit represented by General Formula (2):

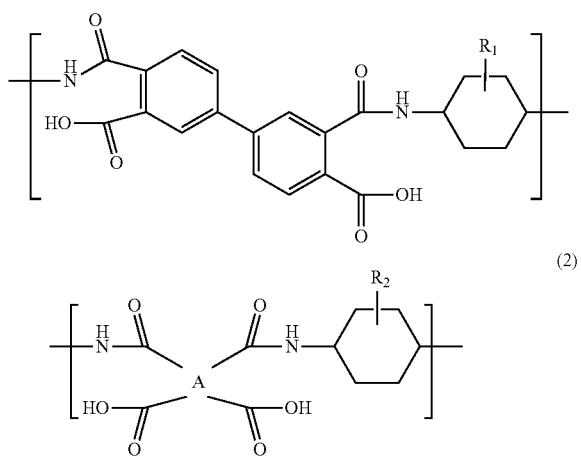

where, each of "$R_1$" and "$R_2$" is a group selected from a hydrogen atom, an alkyl group, a halogen atom, a hydroxyl group, a carboxyl group, and an alkoxyl group, and "$R_1$" and "$R_2$" can be identical with each other or different from each other. In view of expression of low thermal expansion property, it is preferable that "$R_1$" and "$R_2$" are independently the hydrogen atom or the alkyl group, and in view of heat resistance, each of "$R_1$" and "$R_2$" is particularly preferably the hydrogen atom. That is, the constitutional unit represented by Formula (1) is most preferably a polyamic acid constitutional unit which is represented by Formula (8) and is obtained from 3,3',4,4'-biphenyltetracarboxylic dianhydride and 1,4-cyclohexanediamine.

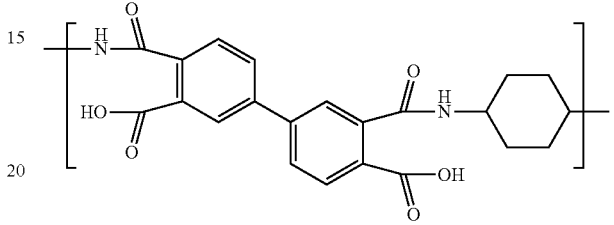

"A" in General Formula (2) is a constitutional unit containing a fluorene skeleton. In view of low birefringence, "A" is preferably one selected from a constitutional unit represented by Formula (3), a constitutional unit represented by Formula (4), and a constitutional unit represented by Formula (5). In view of heat resistance, "A" is particularly preferably the constitutional unit represented by Formula (3).

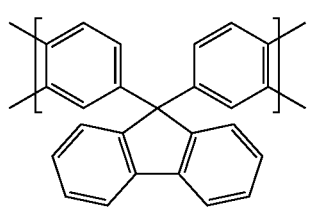

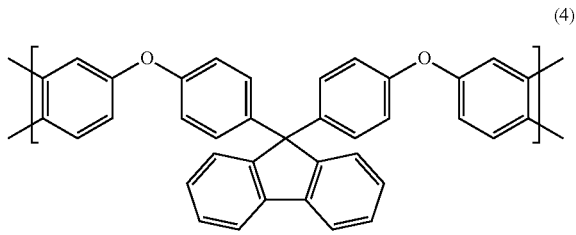

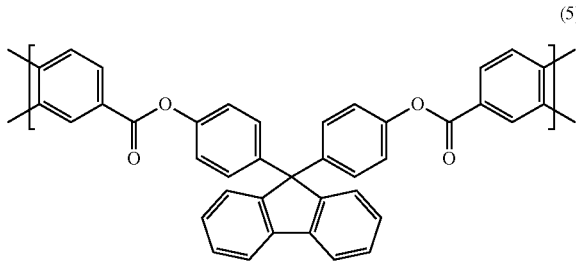

That is, the constitutional unit represented by Formula (2) is preferably one selected from the constitutional unit represented by Formula (9), the constitutional unit represented by Formula (12), and the constitutional unit represented by Formula (13). In view of heat resistance, the constitutional unit represented by Formula (2) is most preferably the constitutional unit represented by Formula (9).

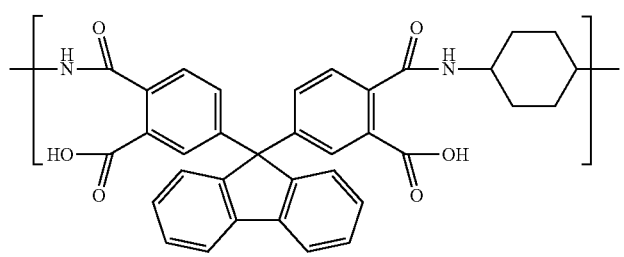

(9)

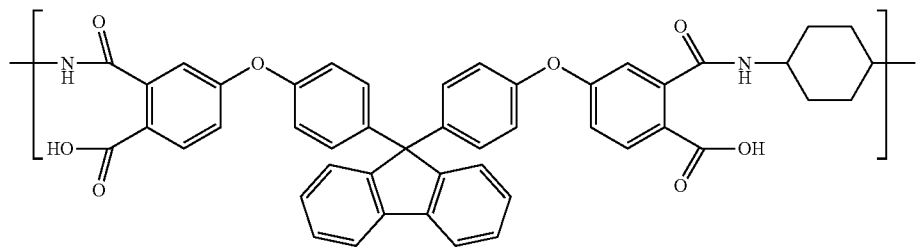

(12)

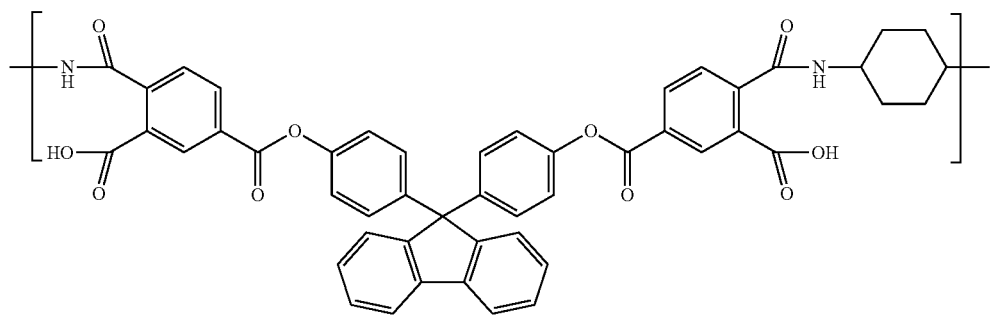

(13)

In view of improvement in heat resistance, low thermal expansion property, transparency, and low birefringence of an obtained polyimide, a total number of moles of the constitutional unit represented by General Formula (1) and the constitutional unit represented by General Formula (2) in the polyamic acid relative to the number of moles of the polyamic acid is preferably 70% or higher, more preferably 80% or higher, particularly preferably 90% or higher. Note that "the number of moles of polyamic acid" indicates the number of moles of all diamine-derived constitutional units constituting the polyamic acid or the number of moles of all acid dianhydride-derived constitutional units constituting the polyamic acid.

The polyamic acid of the present invention contains the constitutional unit represented by General Formula (1) and the constitutional unit represented by General Formula (2). According to the polyamic acid of the present invention containing the constitutional unit represented by Formula (1) and the constitutional unit represented by Formula (2), a molar ratio expressed by the number of moles of the constitutional unit represented by Formula (1)/the number of moles of the constitutional unit represented by Formula (2) is preferably 30/70 or higher, more preferably 50/50 or higher, in view of expression of low thermal expansion property. In view of low birefringence and adhesiveness between the support and the polyimide when the polyamic acid solution applied to the support is imidized, the molar ratio expressed by the number of moles of the constitutional unit represented by Formula (1)/the number of moles of the constitutional unit represented by Formula (2) is preferably 99/1 or lower, more preferably 98/2 or lower, further preferably 97/3 or lower, particularly preferably 95/5 or lower, most preferably 80/20 or lower.

The polyamic acid of the present invention contains the constitutional unit represented by General Formula (1) and the constitutional unit represented by General Formula (2). As above described, it is particularly preferable that the constitutional unit represented by General Formula (1) is the constitutional unit represented by Formula (8), and the constitutional unit represented by General Formula (2) is the constitutional unit represented by Formula (9). According to the polyamic acid of the present invention containing the constitutional unit represented by Formula (8) and the constitutional unit represented by Formula (9), a molar ratio expressed by the number of moles of the constitutional unit represented by Formula (8)/the number of moles of the constitutional unit represented by Formula (9) is preferably 30/70 or higher, more preferably 50/50 or higher, in view of expression of low thermal expansion property. In view of low birefringence and adhesiveness between the support and the polyimide when the polyamic acid solution applied to the support is imidized, the molar ratio expressed by the number of moles of the constitutional unit represented by Formula (8)/the number of moles of the constitutional unit represented by Formula (9) is preferably 99/1 or lower, more preferably 98/2 or lower, further preferably 97/3 or lower, particularly preferably 95/5 or lower, most preferably 80/20 or lower.

In particular, in a batch type process for producing a device, i.e., a process in which (i) a polyamic acid solution, which has been applied to a support such as glass, is imidized by heating so as to be formed into a substrate on which electron elements and the like are provided and then (ii) the substrate thus obtained is peeled off, it is more preferable that sufficient adhesiveness is secured between the support and the polyimide. In this specification, the term "adhesiveness" does not mean adhesion strength but rather means a degree of detachment or floating between the polyimide and the support when the polyamic acid solution applied to the support such as glass is imidized. In other words, in a case where detachment or floating between the polyimide and the support less occurs, this means that adhesiveness between the polyimide and the support is good. Such detachment or floating is formed as a bubble between the support and the polyimide when the polyamic acid solution is applied to the support such as glass and is then imidized. The following description will discuss detachment or floating between the polyimide and the support, with reference to FIG. 1. FIG. 1 is a view schematically illustrating a state in which detachment or floating occurs between a polyimide and a support 1 (e.g., glass) when a polyamic acid solution 2 applied to the support 1 is imidized by heating. When the polyamic acid solution 2 is applied to the support such as glass (see (a) of FIG. 1) and is then heated, imidization of a polyamic acid is started. As the imidization progresses, water and/or an organic solvent of the polyamic acid solution 2 goes out of the polyamic acid which is being imidized (as indicated by arrows in (b) of FIG. 1). In this case, however, a part of the water and/or organic solvent is not discharged from the polyamic acid being imidized (as indicated by arrows with symbols X in (b) of FIG. 1) and remains between the support and the polyamic acid that is being imidized. Then, the water and/or organic solvent remaining between the support and the polyamic acid that is being imidized forms bubble-like detachment or floating between the obtained polyimide and the support as illustrated in (c) of FIG. 1. Then, the water and/or organic solvent is discharged from the bubble-like detachment or floating through the polyimide or the support, and then the bubble part of detachment or floating ultimately becomes a space filled with air. By reducing such detachment or floating, it is possible to accurately form or provide electron elements and the like in the process in which (i) a substrate is formed by providing electron elements and the like on a polyimide film on a support and then (ii) the polyimide substrate on which the electron elements and the like have been provided is peeled off. In particular, in a device having a reduced thickness or a reduced size, even small detachment or floating greatly influences formation or provision of electron elements and the like. Therefore, it is important to reduce the detachment or floating.

In a case where, preferably the molar ratio expressed by the number of moles of the constitutional unit represented by Formula (1)/the number of moles of the constitutional unit represented by Formula (2), more preferably the molar ratio expressed by the number of moles of the constitutional unit represented by Formula (8)/the number of moles of the constitutional unit represented by Formula (9) is 99/1 or lower, adhesiveness between the support and the polyimide is improved. Therefore, in a case where the molar ratio expressed by the number of moles of the constitutional unit represented by Formula (1)/the number of moles of the constitutional unit represented by Formula (2), more preferably the molar ratio expressed by the number of moles of the constitutional unit represented by Formula (8)/the number of moles of the constitutional unit represented by Formula (9) is 99/1 or lower, it is possible to achieve low birefringence and good adhesiveness between the support and the polyimide when the polyamic acid solution applied to the support is imidized.

In particular, in view of achieving (i) low birefringence, (ii) good adhesiveness between the support and the polyimide when the polyamic acid solution applied to the support is imidized, and (iii) particularly low thermal expansion property, the number of moles of the constitutional unit represented by Formula (2)/(the number of moles of the constitutional unit represented by Formula (1)+the number of moles of the constitutional unit represented by Formula (2)) is more preferably 0.01 or more and less than 0.05, further preferably 0.02 or more and less than 0.05. Moreover, from a similar viewpoint, the number of moles of the constitutional unit represented by Formula (9)/(the number of moles of the constitutional unit represented by Formula (8)+the number of moles of the constitutional unit represented by Formula (9)) is more preferably 0.01 or more and less than 0.05, further preferably 0.02 or more and less than 0.05.

The polyimide prepared in the present invention contains the constitutional unit represented by General Formula (6) and the constitutional unit represented by General Formula (7):

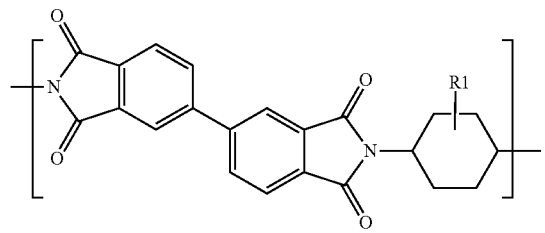

(6)

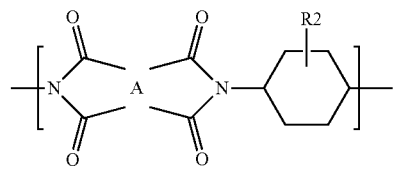

(7)

In General Formulae (6) and (7), "R1", "R2", and "A" are synonymous with respective "$R_1$", "$R_2$", and "A" in General Formula (1) and General Formula (2). That is, General Formula (6) is most preferably a polyimide constitutional unit which is obtained from 3,3',4,4'-biphenyltetracarboxylic dianhydride and 1,4-cyclohexanediamine as indicated in Formula (10).

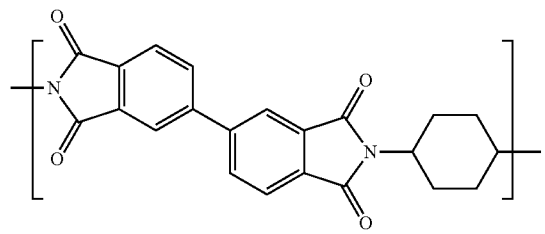

(10)

In General Formula (7), "A" is a constitutional unit containing a fluorene skeleton, and is preferably one selected from constitutional units represented by Formulae (3), (4), and (5) in view of low birefringence, and is particularly preferably the constitutional unit represented by Formula (3) in view of heat resistance. That is, the constitutional unit represented by General Formula (7) is preferably one selected from a constitutional unit represented by Formula (11), a constitutional unit represented by Formula (14), and a constitutional unit represented by Formula (15), and is most preferably the constitutional unit represented by Formula (11) in view of heat resistance.

number of moles of the constitutional unit represented by Formula (7) is preferably 99/1 or lower, more preferably 98/2 or lower, further preferably 97/3 or lower, particularly preferably 95/5 or lower, most preferably 80/20 or lower.

The polyimide of the present invention contains the constitutional unit represented by General Formula (6) and the

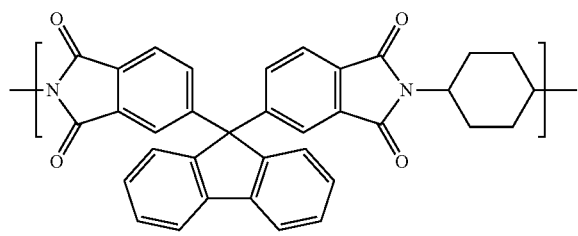

(11)

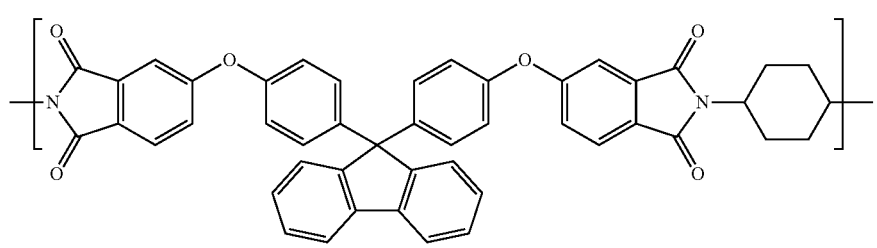

(14)

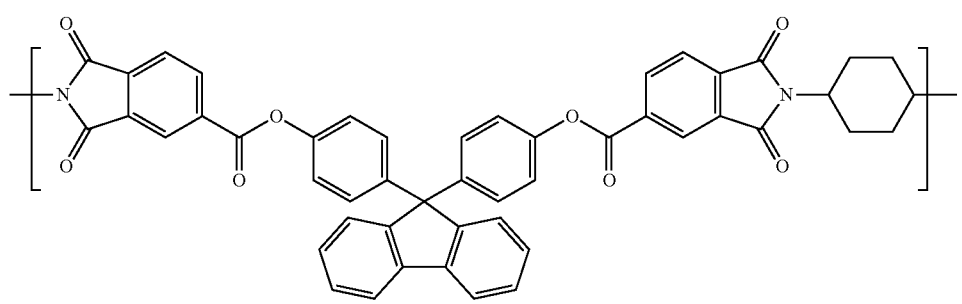

(15)

In view of improvement in heat resistance, low thermal expansion property, transparency, and low birefringence, in the polyimide, the total number of moles of the constitutional unit represented by General Formula (6) and the constitutional unit represented by General Formula (7) is preferably 70% or higher, more preferably 80% or higher, particularly preferably 90% or higher, relative to the number of moles of the polyimide. Note that "the number of moles of the polyimide" indicates the number of moles of all diamine-derived units constituting the polyimide or the number of moles of all acid dianhydride-derived units constituting the polyimide.

The polyimide of the present invention contains the constitutional unit represented by General Formula (6) and the constitutional unit represented by General Formula (7). According to the polyimide of the present invention containing the constitutional unit represented by Formula (6) and the constitutional unit represented by Formula (7), a molar ratio expressed by the number of moles of the constitutional unit represented by Formula (6)/the number of moles of the constitutional unit represented by Formula (7) is preferably 30/70 or higher, more preferably 50/50 or higher, in view of expression of low thermal expansion property. In view of low birefringence and adhesiveness between the support and the polyimide when the polyamic acid solution applied to the support is imidized, the molar ratio expressed by the number of moles of the constitutional unit represented by Formula (6)/the constitutional unit represented by General Formula (7). As above described, it is particularly preferable that the constitutional unit represented by General Formula (6) is the constitutional unit represented by Formula (10), and the constitutional unit represented by General Formula (7) is the constitutional unit represented by Formula (11). According to the polyimide of the present invention containing the constitutional unit represented by Formula (10) and the constitutional unit represented by Formula (11), a molar ratio expressed by the number of moles of the constitutional unit represented by Formula (10)/the number of moles of the constitutional unit represented by Formula (11) is preferably 30/70 or higher, more preferably 50/50 or higher, in view of expression of low thermal expansion property. In view of low birefringence and adhesiveness between the support and the polyimide when the polyamic acid solution applied to the support is imidized, the molar ratio expressed by the number of moles of the constitutional unit represented by Formula (10)/the number of moles of the constitutional unit represented by Formula (11) is preferably 99/1 or lower, more preferably 98/2 or lower, further preferably 97/3 or lower, particularly preferably 95/5 or lower, most preferably 80/20 or lower.

In particular, in view of achieving (i) low birefringence, (ii) good adhesiveness between the support and the polyimide when the polyamic acid solution applied to the support is imidized, and (iii) particularly low thermal expansion property, the number of moles of the constitutional unit represented by Formula (7)/(the number of moles of the constitutional unit represented by Formula (6)+the number of moles of the constitutional unit represented by Formula (7)) is more preferably 0.01 or more and less than 0.05, further preferably 0.02 or more and less than 0.05. From a similar viewpoint, the number of moles of the constitutional unit represented by Formula (11)/(the number of moles of the constitutional unit represented by Formula (10)+the number of moles of the constitutional unit represented by Formula (11)) is more preferably 0.01 or more and less than 0.05, further preferably 0.02 or more and less than 0.05.

The polyimide of the present invention can be obtained by imidizing the polyamic acid that contains the constitutional unit represented by General Formula (1) and the constitutional unit represented by General Formula (2). Alternatively, the polyimide of the present invention can be synthesized from a generally known precursor such as polyamic acid ester or can be produced without using a precursor.

The polyamic acid of the present invention can be synthesized by a generally known method, and can be obtained by causing a diamine to be reacted with tetracarboxylic dianhydride in an organic solvent. Specifically, for example, a diamine solution is prepared by dissolving a diamine in an organic solvent or by dispersing the diamine in an organic solvent in a slurry form in an inert atmosphere such as argon or nitrogen. Meanwhile, tetracarboxylic dianhydride, which (i) has been dissolved in an organic solvent or dispersed in an organic solvent in a slurry form or (ii) is in a solid form, is added to the diamine solution.

In a case where the polyamic acid is synthesized from a diamine and tetracarboxylic dianhydride, a polyamic acid copolymer can be arbitrarily obtained by adjusting the number of total moles of one or more diamine components to be substantially equal to the number of total moles of one or more tetracarboxylic dianhydride components. Alternatively, it is possible to obtain a polyamic acid, which contains a plurality of tetracarboxylic dianhydrides and diamines, by blending two types of polyamic acids. A temperature condition in the reaction of the diamine and the tetracarboxylic dianhydride, that is, in the synthetic reaction of the polyamic acid is not limited to a particular one. In a case where an alicyclic diamine is used, salt formation is more likely to occur. Therefore, the temperature in the synthetic reaction of the polyamic acid can be set to a range between 50° C. and 150° C. as appropriate. When salt is dissolved and the polymerization reaction is started, the temperature in the synthetic reaction of the polyamic acid is preferably set to 80° C. or lower, more preferably 0° C. or higher and 50° C. or lower, in order to inhibit decrease in molecular weight of the polyamic acid. A reaction time can be arbitrarily set within a range between 10 minutes and 30 hours.

The organic solvent used in the synthetic reaction of the polyamic acid is not limited to a particular one, provided that the solvent is an organic polar solvent. As the reaction of the diamine and the tetracarboxylic dianhydride progresses, the polyamic acid is generated, and viscosity of a reaction liquid is increased.

The organic solvent used in polymerization of a polyamic acid is preferably a solvent which can (i) dissolve a tetracarboxylic dianhydride and a diamine to be used and further (ii) dissolve a generated polyamic acid. Examples of the organic solvent used in the synthetic reaction of polyamic acid encompass urea solvents such as tetramethylurea and N,N-dimethylethylurea; sulfoxide or sulphone solvents such as dimethyl sulfoxide, diphenyl sulfone, and tetramethyl sulfone; ester solvents such as N,N-dimethylacetamide (DMAC), N,N-dimethylformamide (DMF), N,N'-diethylacetamide, N-methyl-2-pyrolidone (NMP), and γ-butyrolactone; amide solvents such as hexamethylphosphoric triamide; alkyl halide solvents such as chloroform and methylene chloride; aromatic hydrocarbon solvents such as benzene and toluene; phenol solvents such as phenol and cresol; ketone solvents such as cyclopentanone; and ether solvents such as tetrahydrofuran, 1,3-dioxolane, 1,4-dioxane, dimethyl ether, diethyl ether, and p-cresol methyl ether. In general, these solvents are used independently. However, if needed, two or more of the solvents can be used together as appropriate. In order to enhance solubility and reactivity of the polyamic acid, the organic solvent used in the synthetic reaction of the polyamic acid is preferably selected from the amide solvent, the ketone solvent, the ester solvent, and the ether solvent, particularly preferably the amide solvent such as DMF, DMAC, or NMP.

The polyimide of the present invention can be obtained by a known method, and is not limited to a particular production method. In view of availability of monomers and easiness in polymerization, the polyimide of the present invention is preferably obtained from a polyamic acid which is a precursor thereof. Here, a method is described in which a polyamic acid is imidized in order to obtain a polyimide with the use of the polyamic acid. The imidization is carried out by cyclodehydration of the polyamic acid. The cyclodehydration can be carried out with an azeotropic method using an azeotropic solvent, a thermal method, or a chemical method. The imidization from the polyamic acid to the polyimide can be carried out with any ratio between 1% and 100%. That is, it is possible to synthesize a polyamic acid which is partially imidized. In this specification, a solution containing a polyamic acid and an organic solvent is meant to be a polyamic acid solution. Here, the organic solvent contained in the polyamic acid solution can be an organic solvent similar to that used in the synthetic reaction of the polyamic acid. Among those, the organic solvent is more preferably one selected from the amide solvent, the ketone solvent, the ester solvent, and the ether solvent, particularly preferably the amide solvent such as DMF, DMAC, or NMP. In a case where the polyamic acid is obtained by the above described method, a reaction solution itself thus synthesized is sometimes referred to as "polyamic acid solution".

The cyclodehydration can be carried out by heating the polyamic acid. A method for heating the polyamic acid is not limited to a particular one, and can be, for example, a method in which the polyamic acid solution is flow-casted or applied to a support such as a glass plate, a metal plate, or PET (polyethylene terephthalate), and then heat treatment is carried out at a temperature within a range between 80° C. and 500° C. Alternatively, the cyclodehydration of the polyamic acid can be carried out as follows: that is, the polyamic acid solution is directly put into a container which has been subjected to a release treatment such as coating with a fluorocarbon resin, and the polyamic acid solution is dried with heat under reduced pressure. The polyimide can be obtained by thus carrying out the cyclodehydration of the polyamic acid. Note that the heating time of each process varies depending on a throughput and a heating temperature of the polyamic acid solution subjected to the cyclodehydration. In general, it is preferable that heating is carried out for a time within a range between 1 minute and 5 hours from when a process temperature reaches a maximum temperature. Alternatively, in order to reduce heating time and to express characteristics, a polyamic acid solution to which an imidizing agent and/or a dehydrating catalyst have(has) been added can be imidized by heating with the method as above described.

The imidizing agent is not limited to a particular one and can be tertiary amine. The tertiary amine is further preferably heterocyclic tertiary amine. Concrete examples of the heterocyclic tertiary amine preferably encompass pyridine, picoline, quinoline, and isoquinoline. Concrete examples of the dehydrating catalyst preferably encompass acetic anhydride, propionic anhydride, n-butyric anhydride, benzoic anhydride, and trifluoroacetic anhydride.

In regard to an amount of the imidizing agent and the dehydrating catalyst which are added, an added amount of the imidizing agent is preferably 0.5 to 5.0 molar equivalent, more preferably 0.7 to 2.5 molar equivalent, particularly preferably 0.8 to 2.0 molar equivalent, relative to an amide group of the polyamic acid. Moreover, an added amount of the dehydrating catalyst is preferably 0.5 to 10.0 molar equivalent, more preferably 0.7 to 5.0 molar equivalent, particularly preferably 0.8 to 3.0 molar equivalent, relative to the amide group of the polyamic acid. When adding the imidizing agent and/or the dehydrating catalyst to the polyamic acid solution, the imidizing agent and/or the dehydrating catalyst can be added directly without being dissolved in an organic solvent or can be dissolved in an organic solvent and then added. According to the method in which the imidizing agent and/or the dehydrating catalyst are/is directly added without being dissolved in an organic solvent, a reaction rapidly progresses before the imidizing agent and/or the dehydrating catalyst are/is diffused, and therefore gel may be generated. Under the circumstances, it is more preferable to mix a solution, which has been obtained by dissolving the imidizing agent and/or the dehydrating catalyst in an organic solvent, with the polyamic acid solution.

Although depending on a purpose of use, a weight-average molecular weight of the polyamic acid and the polyimide of the present invention is preferably within a range of 10,000 or more and 500,000 or less, more preferably within a range between 20,000 and 300,000, further preferably within a range between 30,000 and 200,000. Provided that the weight-average molecular weight is 10,000 or more, the polyamic acid and the polyimide can be formed into a coating or a film. Meanwhile, provided that the weight-average molecular weight is 500,000 or less, the polyamic acid and the polyimide show sufficient solubility with respect to a solvent, and it is therefore possible to obtain, from the polyamic acid solution (later described), a coating or a film which has a smooth surface and a uniform film thickness.

In this specification, the molecular weight used herein is equivalent to a molecular weight of polyethylene glycol determined by gel permeation chromatography (GPC).

The polyimide of the present invention can be prepared by applying a polyamic acid solution to a support and then drying or heating the polyamic acid solution. In this specification, a film of the polyimide obtained in the method as above described is sometimes referred to as "polyimide film". Here, the polyamic acid solution can be a solution which is partially imidized. The drying or heating can be carried out in the presence of air or in a nitrogen atmosphere. In view of transparency, the drying or heating is particularly preferably carried out in the nitrogen atmosphere.

The support to which the polyamic acid solution is applied can be a glass substrate; a metal substrate or a metal belt such as SUS; or a plastic film such as polyethylene terephthalate, polycarbonate, polyacrylate, polyethylenenaphthalate, or triacetylcellulose. Note, however, that the support is not limited to these. For use in the current batch type process of producing a device, it is preferable to use a glass substrate.

With regard to a drying temperature or a heating temperature in preparing the polyimide film, a condition suitable for the process can be selected, and the drying temperature or the heating temperature is not limited to a particular one, provided that the characteristics are not influenced.

Transparency of the polyimide is expressed based on, for example, total-light transmittance or haze in accordance with JIS K7105-1981. In a case where the polyimide film is used for a purpose of the present invention (later described), the total-light transmittance of the polyimide is preferably 80% or higher, more preferably 85% or higher. Moreover, the haze is preferably 2.0% or lower, more preferably 1.0% or lower. According to the purpose of use of the present invention, the polyimide is demanded to have high transmittance in the entire wavelength range. However, the polyimide tends to absorb light on a shorter wavelength side, and the film itself is often colored in yellow. In order to use the polyimide for the purpose of the present invention, an optical transmittance at a wavelength of 400 nm of the polyimide, which has a film thickness of 10 µm, is preferably 50% or higher, more preferably 60% or higher, further preferably higher than 70%. The optical transmittance at the wavelength of 400 nm is measured with an ultraviolet-visible spectrophotometer. By thus having such transparency, the polyimide film can be used as a transparent substrate for use as a replacement for glass.

The polyimide of the present invention has a low linear thermal expansion characteristic and dimensional stability through heating, as film characteristics. For example, the values are measured by thermomechanical analysis (TMA) as follows: That is, (i) TMA120C (manufactured by Seiko Instruments Inc.) is used (sample size: width of 3 mm and length of 10 mm, film thickness is measured and cross-sectional area of film is calculated), (ii) a load is set to 3 gf, (iii) a temperature is once heated up from 10° C. to 340° C. at 10° C./min, then cooled down to 10° C., and then heated up again to 340° C. at 10° C./min, and (iv) a linear thermal expansion coefficient in a temperature range from 100° C. to 300° C. is obtained from an amount of change in distortion of the sample per unit temperature range from 100° C. to 300° C. in the second heating-up. According to the present invention, it is possible to obtain the polyimide which has the linear thermal expansion coefficient, thus calculated, of 50 ppm/K or less, more preferably 40 ppm/K or less.

In view of heat resistance, a glass transition temperature is preferably as high as possible. Specifically, in differential scanning calorimetry (DSC) or in dynamic viscoelasticity analysis (DMA), a glass transition temperature measured at a heating rate of 10° C./min is preferably 250° C. or higher, more preferably 300° C. or higher because it is possible to withstand even a high process temperature.

In a case where the polyimide is used for the purpose of the present invention, the polyimide preferably has an optical characteristic of low birefringence. A polyimide is easily oriented in a plane, and has a large difference (birefringence) in refractive index between an in-plane direction and a thickness direction. In particular, in a case of a polyimide showing a low thermal expansion characteristic, birefringence tends to be high. In order to use for the purpose of the present invention, it is preferable to satisfy the following:

$nx-ny<0.0010$ and $(nx+ny)/2-nz<0.160$ it is more preferable to satisfy the following:

$nx-ny<0.0010$ and $(nx+ny)/2-nz\leq0.120$ it is further preferable to satisfy the following:

$nx-ny<0.0010$ and $(nx+ny)/2-nz<0.100$ and, because higher optical isotropy is preferable, it is particularly preferable to satisfy the following:

$nx-ny<0.0010$ and $(nx+ny)/2-nz<0.050$ where "nx" is a maximum in-plane refractive index, "ny" is a minimum in-plane refractive index, and "nz" is a refractive index in the thickness direction. Here, "(nx+ny)/2-nz" indicates a difference in refractive index between the in-plane direction and the thickness direction, i.e., birefringence. This value is preferably as low as possible because further excellent optical isotropy can be achieved. In this case, "nx-ny" is more preferably less than 0.0002, further preferably less than 0.0001.

The polyamic acid and the polyimide of the present invention can be used, as they are, in a coating process or a shaping process for producing a product or a member. Alternatively, the polyamic acid and the polyimide of the present invention can be a laminate for carrying out a process of, for example, further coating an object that has been shaped in a film. In order to subject the polyamic acid and the polyimide to such a coating or shaping process, if needed, a polyamic acid composition and polyimide resin composition can be prepared by (i) dissolving or dispersing the polyamic acid and the polyimide in an organic solvent and further (ii) mixing with a photo-curing or thermosetting component, a non-polymerizable binder resin other than the polyamic acid and the polyimide of the present invention, and other components.

In order to give processing characteristics and various functionalities to the polyamic acid and the polyimide of the present invention, the polyamic acid and the polyimide can be mixed with other various organic or inorganic low-molecular or high-molecular compounds. For example, it is possible to use a dye, a surfactant, a leveling agent, an elasticizer, fine particles, a sensitizer, and the like. The fine particles encompass, for example, (i) organic fine particles such as polystyrene and polytetrafluoroethylene and (ii) inorganic fine particles such as colloidal silica, carbon, and sheet silicate. Those fine particles can be porous or have a hollow structure. Moreover, the fine particles can serve as or can be in a form of a pigment, a filler, a fiber, and the like.

According to the polyamic acid and the polyimide of the present invention, the polyamic acid represented by General Formulae (1) and (2) or the polyimide represented by Formulae (6) and (7) is generally contained within a range between 60% by weight and 99.9% by weight relative to an entire solid content of a composition. In other words, according to the polyamic acid and the polyimide of the present invention, the polyamic acid containing the constitutional unit represented by General Formula (1) and the constitutional unit represented by General Formula (2) or the polyimide containing the constitutional unit represented by General Formula (6) and the constitutional unit represented by General Formula (7) is generally contained within a range between 60% by weight and 99.9% by weight relative to the entire solid content of the composition. More preferably, according to the polyamic acid and the polyimide of the present invention, the polyamic acid containing the constitutional unit represented by Formula (8) and the constitutional unit represented by Formula (9) or the polyimide containing the constitutional unit represented by General Formula (10) and the constitutional unit represented by General Formula (11) is generally contained within a range between 60% by weight and 99.9% by weight relative to the entire solid content of the composition. Note that "99.9% by weight" means "substantially all". A mixing ratio of other arbitrary component(s) is preferably within a range between 0.1% by weight and 95% by weight relative to an entire solid content of the polyimide. In a case where the mixing ratio is 0.1% by weight or higher, an effect of an additive can be easily brought about. In a case where the mixing ratio is 95% by weight or lower, characteristics of the resin composition can be easily reflected in an end product. Note that the "solid content of the composition" indicates all components other than the organic solvent, and a liquid monomer component is also encompassed in the solid content.

The polyimide film of the present invention can have a surface on which various inorganic thin films (such as a metal oxide film and a transparent electrode film) are formed. A method for preparing such inorganic thin films is not limited to a particular one and can be, for example, a CVD method and PVD methods such as a sputtering method, a vacuum vapor deposition method, and an ion plating method.

The polyimide of the present invention (i) has low birefringence, in addition to heat resistance, low thermal expansion property, and transparency and (ii) provides good adhesiveness between the support and the polyimide. Therefore, the polyimide of the present invention is preferably used in a field and a product for which the characteristics are effective. Examples of such a field and a product encompass a printed matter, a color filter, a flexible display, an optical film, a liquid crystal display device, an image display device such as an organic EL and an electronic paper, a 3-D display, a touch panel, a transparent conductive film substrate, and a solar cell. It is further preferable to use the polyimide of the present invention as an alternative material for a part which has conventionally been made of glass. That is, the polyamic acid of the present invention containing the constitutional unit represented by General Formula (1) and the constitutional unit represented by General Formula (2), preferably the polyamic acid in which the constitutional unit represented by General Formula (1) is the constitutional unit represented by Formula (8) and the constitutional unit represented by General Formula (2) is the constitutional unit represented by Formula (9), and the polyimide containing the constitutional unit represented by General Formula (6) and the constitutional unit represented by General Formula (7), preferably the polyimide in which the constitutional unit represented by Formula (6) is the constitutional unit represented by Formula (10) and the constitutional unit represented by Formula (7) is the constitutional unit represented by Formula (11), are particularly suitable for use in a substrate, an image display device, an optical material, or an electronic device material. The substrate encompasses, for example, a TFT substrate, an ITO substrate, and a flexible display substrate. The image display device encompasses, for example, an organic EL, an electronic paper, and a touch panel. The optical material encompasses, for example, a color filter. The polyimide of the present invention is expected to be used as an antireflection film, hologram, an optical member or a constructional material, and a structure.

Moreover, the polyamic acid, the polyimide, and the polyamic acid solution of the present invention can be suitably used in a batch type device producing process in which (i) a polyamic acid solution is applied to a support and is then imidized by heating so as to form a substrate on which electron elements and the like are provided, and (ii) the substrate is then peeled off from the support. Therefore, the present invention includes a method for manufacturing an electronic device, which method includes the step of forming a substrate in which step (i) a polyamic acid solution is applied to a support and is then imidized by heating, and (ii) electron elements and the like are provided on the polyimide film thus formed on the support. Moreover, the method for manufacturing the electronic device can further include the step of peeling off the polyimide substrate, on which the electron elements and the like have been formed, from the support after the step of forming the substrate.

The present invention has the following configurations:

1. The polyamic acid containing a constitutional unit represented by General Formula (1) and a constitutional unit represented by General Formula (2):

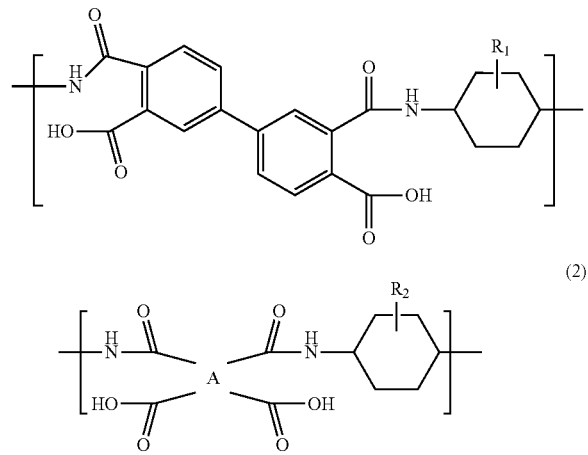

(1)

(2)

where, each of "$R_1$" and "$R_2$" is a group selected from a hydrogen atom, an alkyl group, a halogen atom, a hydroxyl group, a carboxyl group, and an alkoxyl group, "$R_1$" and "$R_2$" are identical with each other or different from each other, and "A" in General Formula (2) is an acid dianhydride-derived component which is one selected from a constitutional unit represented by Formula (3), a constitutional unit represented by Formula (4), and a constitutional unit represented by Formula (5):

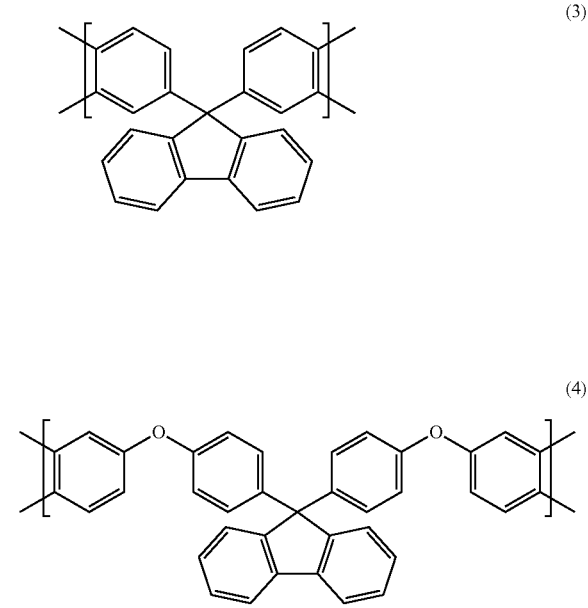

(3)

(4)

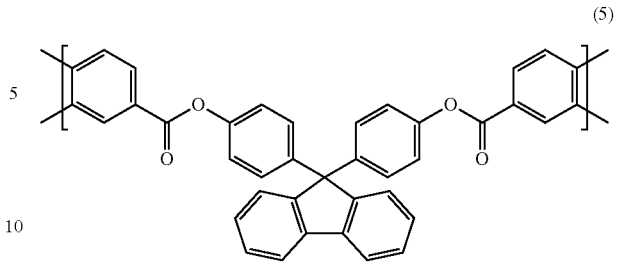

(5)

2. The polyamic acid described in the above 1, in which, a molar ratio represented by "the number of moles of the constitutional unit represented by Formula (1)/the number of moles of the constitutional unit represented by Formula (2)" falls within a range between 30/70 and 99/1.

3. The polyamic acid described in the above 1 or 2, in which the constitutional unit represented by General Formula (1) is a constitutional unit represented by Formula (8) below, and the constitutional unit represented by General Formula (2) is a constitutional unit represented by Formula (9) below:

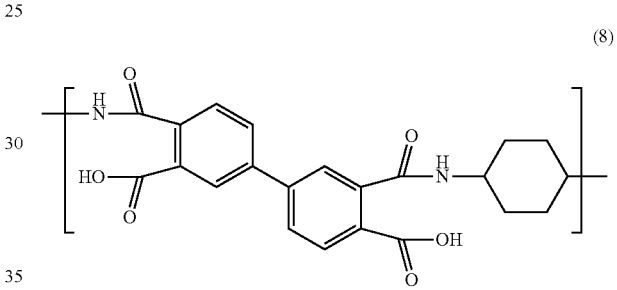

(8)

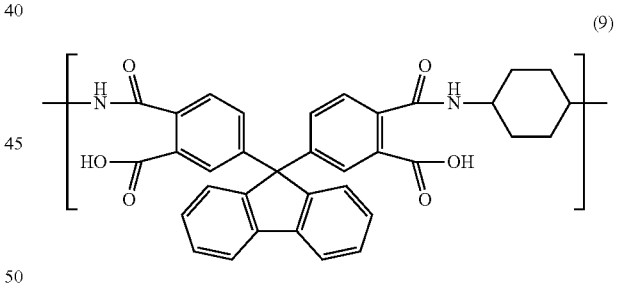

(9)

4. The polyamic acid solution containing the polyamic acid described in any one of the above 1 through 3 and an organic solvent.

5. The polyamic acid solution described in the above 4, in which the organic solvent contains at least one selected from an amide solvent, a ketone solvent, an ester solvent, and an ether solvent.

6. The polyimide which is obtained by applying the polyamic acid solution described in the above 4 or 5 to a support.

7. The polyimide which is obtained by imidizing a polyamic acid described in any one of the above 1 through 3.

8. The polyimide containing a constitutional unit represented by General Formula (6) and a constitutional unit represented by General Formula (7):

(6)

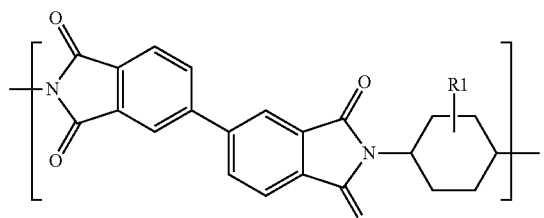

(7)

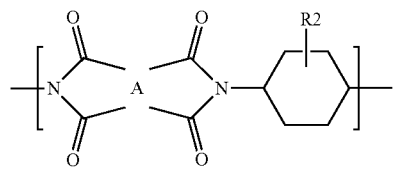

where, each of "R1" and "R2" is a group selected from a hydrogen atom, an alkyl group, a halogen atom, a hydroxyl group, a carboxyl group, and an alkoxyl group, "R1" and "R2" are identical with each other or different from each other, and "A" in General Formula (7) is an acid dianhydride-derived component which is one selected from a constitutional unit represented by Formula (3), a constitutional unit represented by Formula (4), and a constitutional unit represented by Formula (5):

(3)

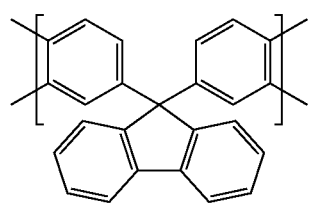

(4)

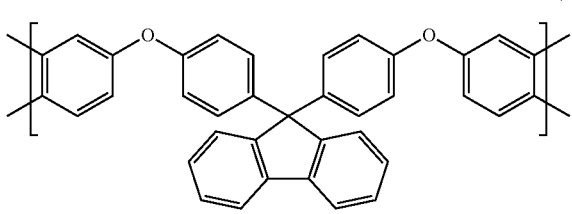

(5)

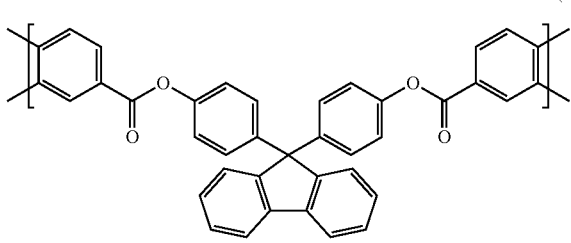

9. The polyimide described in the above 8, in which a molar ratio represented by "the number of moles of the constitutional unit represented by Formula (6)/the number of moles of the constitutional unit represented by Formula (7)" falls within a range between 30/70 and 99/1.

10. The polyimide described in the above 8 or 9, in which the constitutional unit represented by General Formula (6) is a constitutional unit represented by Formula (10) below, and the constitutional unit represented by General Formula (7) is a constitutional unit represented by Formula (11) below:

(10)

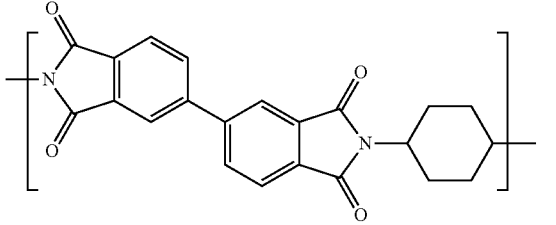

(11)

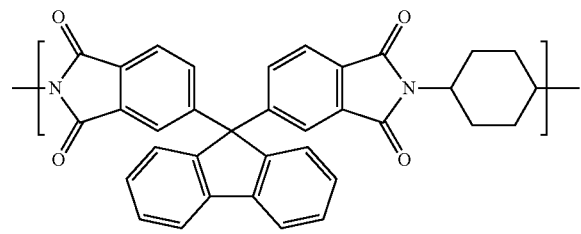

11. The polyimide described in any one of the above 6 through 10, in which an optical transmittance at a wavelength of 400 nm is 50% or higher when a film thickness is 10 μm.

12. The polyimide described in any one of the above 6 through 11, in which a thermal expansion coefficient in a temperature range from 100° C. to 300° C. is 50 ppm/K or lower when a film thickness is 10 μm.

13. The polyimide described in any one of the above 6 through 12, wherein nx−ny<0.0010 and (nx+ny)/2−nz<0.160 are satisfied, where "nx" is a maximum in-plane refractive index, "ny" is a minimum in-plane refractive index, and "nz" is a refractive index in a thickness direction.

14. The polyimide described in any one of the above 6 through 13, wherein a glass transition temperature is 250° C. or higher.

15. The substrate containing the polyimide described in any one of the above 6 through 14.

16. The optical material containing the polyimide described in any one of the above 6 through 14.

17. The image display device containing the polyimide described in any one of the above 6 through 14.

18. The electronic device material containing the polyimide described in any one of the above 6 through 14.

EXAMPLES

Evaluation Method

The material characteristic values and the like described in this specification were obtained by the following evaluation method:

(1) Molecular Weight of Polyamic Acid

A weight-average molecular weight (Mw) was determined under the conditions described in Table 1. Results of the evaluation are indicated in Table 2.

TABLE 1

| Items | Molecular weight measuring device conditions |
|---|---|
| Device | CO-8020, SD-8022, DP-8020, AS-8020, RI-8020 (each of which is manufactured by Tosoh Corporation) |

TABLE 1-continued

| Items | Molecular weight measuring device conditions |
|---|---|
| Column | Shodex: GPC KD-806M × 2 |
| Column size | Each: 8 mmΦ × 30 cm, total: 60 cm |
| | Guard column (GPC KD-G) 4.6 mmΦ × 1 cm |
| Column temperature | 40° C. |
| Eluent | 30 mM-LiBr + 30 mM-phosphoric acid/DMF |
| Flow rate | 0.6 mL/min |
| Injection pressure | Approximately 1.3 MPa to 1.7 MPa |
| Injection amount | 30 μL (solid content concentration: 0.4% by weight) |
| Reference sample | Polyethylene oxide (used for creation of calibration curve) |
| Detector | RI |
| Calibration curve | Linear |

(2) Transmittance of Polyimide Film

Optical transmittance of a polyimide film at a wavelength ranging from 200 nm to 800 nm was measured with the use of an ultraviolet-visible-near infrared spectrophotometer (V-650, manufactured by JASCO Corporation), and optical transmittance at a wavelength of 400 nm was used as an indicator. Moreover, a wavelength (cutoff wavelength) at which transmittance is 0.5% or lower was also obtained.

(3) Linear Thermal Expansion Coefficient (CTE) of Film

A linear thermal expansion coefficient was measured with the use of TMA120C (manufactured by Seiko Instruments Inc.) (sample size: width of 3 mm, length of 10 mm; film thickness was measured and cross-sectional area of film was calculated). In the measurement, a load was set to 3 gf, and a temperature was once heated up from 10° C. to 340° C. at 10° C./min, then cooled down to 10° C., and further heated up to 340° C. at 10° C./min, and a linear expansion coefficient was calculated from an amount of change in distortion of the sample per unit temperature range from 100° C. to 300° C. in the second heating-up.

(4) Glass Transition Temperature (Tg) of Polyimide Film

With the use of TMA120C (manufactured by Seiko Instruments Inc.) (sample size: width of 3 mm, length of 10 mm; film thickness was measured and cross-sectional area of film was calculated), an amount of change in distortion of the film was measured when the temperature was heated up from 10° C. to 400° C. at 10° C./min with a load of 3 g. A temperature at an inflection point of the amount of change was determined as a glass transition temperature.

(5) Total-Light Transmittance of Polyimide Film

Total-light transmittance was measured with the use of an integrating sphere-type hazemeter 300A (manufactured by NIPPON DENSHOKU INDUSTRIES CO., LTD.) in accordance with a method described in JIS K7105-1981.

(6) Haze of Polyimide Film

Haze was measured with the use of the integrating sphere-type hazemeter 300A (manufactured by NIPPON DENSHOKU INDUSTRIES CO., LTD.) in accordance with a method described in JIS K7105-1981.

(7) Measurement of Retardation

With the use of a retardation meter OPTIPRO (manufactured by SHINTECH, Inc.), an in-plane retardation and an out of plane retardation at a wavelength of 590 nm were measured. With the use of the retardations, "nx−ny" and "(nx+ny)/2−nz" were calculated. Here, "nx" is a maximum in-plane refractive index, "ny" is a minimum in-plane refractive index, and "nz" is a refractive index in the thickness direction.

(8) Evaluation of Adhesiveness to Glass

A polyamic acid solution was applied to a non-alkali glass having a size of 150 mm×150 mm×0.7 mm and was then dried in the air at 60° C. for 30 minutes. Then, the temperature was increased to 350° C. at a rate of 6.5° C./min under a nitrogen atmosphere, and drying was further carried out at 350° C. for 2 hours. Thus, a polyimide film was prepared. Note that a film thickness of the polyimide film was set to 10 μm. The polyimide film was observed in terms of detachment or floating from the glass. Observation of the polyimide film in terms of detachment or floating from the glass was carried out by counting the number of bubble-like detachments from the glass which detachments exist in the polyimide film of 150 mm×150 mm. Note that only detachments having a longer side of 5 mm or longer were counted. The followings are criteria for evaluation of the adhesiveness between the support and the polyimide.

5: No detachment
4: 1 to 2 detachments
3: 3 to 5 detachments
2: 5 or more detachments or detachment accounts for 25% or higher of an applied area
1: Detachment accounts for 50% or higher of an applied area Example 1

Polymerization of Polyamic Acid

Into a 500 mL glass separable flask equipped with (i) a stirrer having a stainless stirring rod and (ii) a nitrogen inlet tube, 7.8 g of trans-1,4-cyclohexanediamine (hereinafter, sometimes referred to as "CHDA") was introduced. To the CHDA, 120.0 g of N,N-dimethylacetamide (hereinafter, sometimes referred to as "DMAC") which had been dehydrated was added as an organic solvent for polymerization, and the mixture solution thus obtained was stirred. Subsequently, to the solution, 16.0 g of 3,3',4,4'-biphenyltetracarboxylic anhydride (hereinafter, sometimes referred to as "BPDA") and 6.2 g of 9,9-bis(3,4-dicarboxyphenyl)fluorene dianhydride (hereinafter, sometimes referred to as "BPAF") were simultaneously added, and the mixture solution thus obtained was heated at 120° C. for 5 minutes, then cooled down, then stirred at a room temperature (23° C.) for 5 hours, and a polyamic acid was thus obtained. Ratios of respective added monomers were as follows: i.e., BPDA was 80 mol % and BPAF was 20 mol %, relative to 100 mol % of CHDA. Note that an amount of the diamine compound and the tetracarboxylic dianhydride added to the reaction solution was 20% by weight relative to the entire reaction solution. A weight-average molecular weight (Mw) of the obtained polyamic acid was 30,000.

<Preparation of Polyimide Film>

The polyamic acid solution thus polymerized was applied to a glass plate with the use of a bar coater, and was then dried in the air at 60° C. for 30 minutes and in the nitrogen atmosphere at 350° C. for 1 hour. As a result, a polyimide film having a film thickness of 10 μm was obtained. With regard to the polyimide film thus obtained, a transmittance at a wavelength of 400 nm was 80%, (nx+ny)/2−nz was 0.043, CTE was 33 ppm/K, and a glass transition temperature was 367° C. A result of evaluation of adhesiveness to glass of a polyimide film, which had been obtained with the use of the polyamic acid solution thus polymerized, was 5. The result of evaluating the polyimide film is indicated in Table 2.

TABLE 2

|  | Acid Dianhydride | | | Diamine | | | Molecular | | Film |
|  | BPDA (mol %) | PMDA (mol %) | BPAF (mol %) | CHDA (mol %) | PDA (mol %) | ODA (mol %) | Weight (Mw) | Solvent | Thickness (μm) |
| --- | --- | --- | --- | --- | --- | --- | --- | --- | --- |
| Example 1 | 80 |  | 20 | 100 |  |  | 30,000 | DMAC | 10 |
| Example 2 | 60 |  | 40 | 100 |  |  | 32,000 | DMAC | 10 |
| Example 3 | 50 |  | 50 | 100 |  |  | 40,000 | DMAC | 10 |
| Example 4 | 80 |  | 20 | 100 |  |  | 45,000 | DMAC | 10 |
| Example 5 | 50 |  | 50 | 100 |  |  | 45,000 | DMAC | 10 |
| Example 6 | 99 |  | 1 | 100 |  |  | 50,000 | DMAC | 10 |
| Example 7 | 97 |  | 3 | 100 |  |  | 50,000 | DMAC | 10 |
| Example 8 | 95 |  | 5 | 100 |  |  | 50,000 | DMAC | 10 |
| Com. Ex. 1 | 100 |  |  | 100 |  |  | 45,000 | DMAC | 10 |
| Com. Ex. 2 | 100 |  |  | 100 |  |  | 45,000 | NMP | 10 |
| Com. Ex. 3 |  |  | 100 | 100 |  |  | 62,000 | DMAC | 10 |
| Com. Ex. 4 |  | 90 | 10 |  |  | 100 | 50,000 | DMAC | 10 |
| Com. Ex. 5 | 20 | 75 | 5 |  | 15 | 85 | 50,000 | DMAC | 10 |

|  | Transmittance | | | Total-light Transmittance (%) | Birefringence | | CTE | Glass Transition Temperature | Adhesiveness |
|  | at 400 nm (%) | Cut off (nm) | Haze (%) |  | nx − ny | (nx + ny)/2 − nz | CTE (ppm/K) | Tg (° C.) | to glass |
| --- | --- | --- | --- | --- | --- | --- | --- | --- | --- |
| Example 1 | 80 | 364 | 0.2 | 88 | 0.0000 | 0.043 | 33 | 367 | 5 |
| Example 2 | 82 | 360 | 0.2 | 88 | 0.0000 | 0.018 | 46 | 365 | 5 |
| Example 3 | 82 | 360 | 0.2 | 89 | 0.0000 | 0.011 | 47 | 365 | 5 |
| Example 4 | 78 | 366 | 0.4 | 88 | 0.0000 | 0.073 | 27 | 365 | 5 |
| Example 5 | 79 | 362 | 0.4 | 88 | 0.0000 | 0.044 | 36 | 365 | 5 |
| Example 6 | 74 | 372 | 0.4 | 87 | 0.0000 | 0.120 | 11 | 360 | 3 |
| Example 7 | 77 | 373 | 0.3 | 88 | 0.0000 | 0.120 | 13 | 360 | 5 |
| Example 8 | 78 | 373 | 0.3 | 85 | 0.0000 | 0.115 | 15 | 362 | 5 |
| Com. Ex. 1 | 70 | 370 | 0.5 | 84 | 0.0000 | 0.120 | 11 | 360 | 2 |
| Com. Ex. 2 | 49 | 370 | 0.5 | 89 | 0.0000 | 0.160 | 7 | 360 | 2 |
| Com. Ex. 3 | 83 | 341 | 0.3 | 83 | 0.0000 | 0.001 | 52 | 376 | 5 |
| Com. Ex. 4 | 0 | 403 | 0.2 | 82 | 0.0000 | 0.048 | 41 | 375 | 5 |
| Com. Ex. 5 | 0 | 400 | 0.3 | 84 | 0.0000 | 0.060 | 36 | 357 | 5 |

Com. Ex.: Comparative Example

Example 2

Polymerization of Polyamic Acid

Into a 500 mL glass separable flask equipped with (i) a stirrer having a stainless stirring rod and (ii) a nitrogen inlet tube, 7.2 g of CHDA was introduced. To the CHDA, 120.0 g of DMAC which had been dehydrated was added as an organic solvent for polymerization, and the mixture solution thus obtained was stirred. Subsequently, to the solution, 11.2 g of BPDA and 11.6 g of BPAF were simultaneously added, and then the mixture solution thus obtained was heated at 120° C. for 5 minutes, then cooled down, then stirred at a room temperature (23° C.) for 5 hours, and a polyamic acid was thus obtained. Ratios of respective added monomers were as follows: i.e., BPDA was 60 mol % and BPAF was 40 mol %, relative to 100 mol % of CHDA. Note that an amount of the diamine compound and the tetracarboxylic dianhydride added to the reaction solution was 20% by weight relative to the entire reaction solution. A weight-average molecular weight (Mw) of the obtained polyamic acid was 32,000.

<Preparation of Polyimide Film>

The polyamic acid solution thus polymerized was applied to a glass plate with the use of a bar coater, and was then dried in the air at 60° C. for 30 minutes and in the nitrogen atmosphere at 350° C. for 1 hour. As a result, a polyimide film having a film thickness of 10 μm was obtained. With regard to the polyimide film thus obtained, a transmittance at a wavelength of 400 nm was 82%, (nx+ny)/2−nz was 0.018, CTE was 46 ppm/K, and a glass transition temperature was 365° C. A result of evaluation of adhesiveness to glass of a polyimide film, which had been obtained with the use of the polyamic acid solution thus polymerized, was 5. The result of evaluating the polyimide film is indicated in Table 2.

Example 3

Polymerization of Polyamic Acid

Into a 500 mL glass separable flask equipped with (i) a stirrer having a stainless stirring rod and (ii) a nitrogen inlet tube, 7.0 g of CHDA was introduced. To the CHDA, 120.0 g of DMAC which had been dehydrated was added as an organic solvent for polymerization, and the mixture solution thus obtained was stirred. Subsequently, to the solution, 9.0 g of BPDA and 14.0 g of BPAF were added, and then the mixture solution thus obtained was heated at 120° C. for 5 minutes, then cooled down, then stirred at a room temperature (23° C.) for 5 hours, and a polyamic acid was thus obtained. Ratios of respective added monomers were as follows: i.e., BPDA was 50 mol % and BPAF was 50 mol %, relative to 100 mol % of CHDA. Note that an amount of the diamine compound and the tetracarboxylic dianhydride added to the reaction solution was 20% by weight relative to the entire reaction solution. A weight-average molecular weight (Mw) of the obtained polyamic acid was 40,000.

<Preparation of Polyimide Film>

The polyamic acid solution thus polymerized was applied to a glass plate with the use of a bar coater, and was then dried in the air at 60° C. for 30 minutes and in the nitrogen atmosphere at 350° C. for 1 hour. As a result, a polyimide film having a film thickness of 10 μm was obtained. With regard to the polyimide film thus obtained, a transmittance at a wavelength of 400 nm was 82%, (nx+ny)/2−nz was 0.011, CTE was 47 ppm/K, and a glass transition temperature was 365° C. A result of evaluation of adhesiveness to glass of a polyimide film, which had been obtained with the use of the polyamic acid solution thus polymerized, was 5. The result of evaluating the polyimide film is indicated in Table 2.

Example 4

Polymerization of Polyamic Acid

Into a 500 mL glass separable flask equipped with (i) a stirrer having a stainless stirring rod and (ii) a nitrogen inlet tube, 6.2 g of CHDA was introduced. To the CHDA, 170.0 g of DMAC was added as an organic solvent for polymerization, and the mixture solution thus obtained was stirred. Subsequently, to the solution, 16.0 g of BPDA was added, and then the mixture solution thus obtained was heated at 100° C. for 30 minutes, and then stirred at a room temperature for 1 hour. After that, 1.5 g of CHDA was added to the solution, and 6.2 g of BPAF was further added, and the mixture was heated again at 100° C. for 20 minutes, then cooled down, then stirred at a room temperature (23° C.) for 5 hours, and a polyamic acid was thus obtained. Ratios of respective added monomers were as follows: i.e., BPDA was 80 mol % and BPAF was 20 mol %, relative to 100 mol % of CHDA. Note that an amount of the diamine compound and the tetracarboxylic dianhydride added to the reaction solution was 15% by weight relative to the entire reaction solution. A weight-average molecular weight (Mw) of the obtained polyamic acid was 45,000.

<Preparation of Polyimide Film>

The polyamic acid solution thus polymerized was diluted with DMAC to a solid content concentration of 10%, and the solution thus diluted was applied to a glass plate with a bar coater, and was then dried in the air at 60° C. for 30 minutes and in the nitrogen atmosphere at 350° C. for 1 hour. As a result, a polyimide film having a film thickness of 10 μm was obtained. With regard to the polyimide film thus obtained, a transmittance at a wavelength of 400 nm was 78%, (nx+ny)/2−nz was 0.073, CTE was 27 ppm/K, and a glass transition temperature was 365° C. A result of evaluation of adhesiveness to glass of a polyimide film, which had been obtained with the use of the polyamic acid solution diluted with DMAC to the solid content concentration of 10%, was 5. The result of evaluating the polyimide film is indicated in Table 2.

Example 5

Polymerization of Polyamic Acid

Into a 500 mL glass separable flask equipped with (i) a stirrer having a stainless stirring rod and (ii) a nitrogen inlet tube, 3.5 g of CHDA was introduced. To the CHDA, 170.0 g of DMAC was added as an organic solvent for polymerization, and the mixture solution thus obtained was stirred. Subsequently, to the solution, 9.0 g of BPDA was added, and then the mixture solution thus obtained was heated at 100° C. for 30 minutes, and then stirred at a room temperature for 1 hour. After that, 3.5 g of CHDA was added to the solution, and 14.0 g of BPAF was further added, and the mixture was heated again at 100° C. for 20 minutes, then cooled down, then stirred at a room temperature (23° C.) for 5 hours, and a polyamic acid was thus obtained. Ratios of respective added monomers were as follows: i.e., BPDA was 50 mol % and BPAF was 50 mol %, relative to 100 mol % of CHDA. Note that an amount of the diamine compound and the tetracarboxylic dianhydride added to the reaction solution was 15% by weight relative to the entire reaction solution. A weight-average molecular weight (Mw) of the obtained polyamic acid was 45,000.

<Preparation of Polyimide Film>

The polyamic acid solution thus polymerized was diluted with DMAC to a solid content concentration of 10%, and the solution thus diluted was applied to a glass plate with a bar coater, and was then dried in the air at 60° C. for 30 minutes and in the nitrogen atmosphere at 350° C. for 1 hour. As a result, a polyimide film having a film thickness of 10 μm was obtained. With regard to the polyimide film thus obtained, a transmittance at a wavelength of 400 nm was 79%, (nx+ny)/2−nz was 0.044, CTE was 36 ppm/K, and a glass transition temperature was 365° C. A result of evaluation of adhesiveness to glass of a polyimide film, which had been obtained with the use of the polyamic acid solution diluted with DMAC to the solid content concentration of 10%, was 5. The result of evaluating the polyimide film is indicated in Table 2.

Example 6

Polymerization of Polyamic Acid

Into a 500 mL glass separable flask equipped with (i) a stirrer having a stainless stirring rod and (ii) a nitrogen inlet tube, 8.3 g of CHDA was introduced. To the CHDA, 170.0 g of DMAC which had been dehydrated was added as an organic solvent for polymerization, and the mixture solution thus obtained was stirred. Subsequently, to the solution, 21.3 g of BPDA and 0.3 g of BPAF were added, and then the mixture solution thus obtained was heated at 100° C. for 5 minutes, then cooled down, then stirred at a room temperature (i.e., 23° C.) for 5 hours, and a polyamic acid was thus obtained. Ratios of respective added monomers were as follows: i.e., BPDA was 99 mol % and BPAF was 1 mol %, relative to 100 mol % of CHDA. Note that an amount of the diamine compound and the tetracarboxylic dianhydride added to the reaction solution was 15% by weight relative to the entire reaction solution. A weight-average molecular weight (Mw) of the obtained polyamic acid was 50,000.

<Preparation of Polyimide Film>

The polyamic acid solution thus polymerized was diluted with DMAC to a solid content concentration of 10%, and the solution thus diluted was applied to a glass plate with a bar coater, and was then dried in the air at 60° C. for 30 minutes and in the nitrogen atmosphere at 350° C. for 1 hour. As a result, a polyimide film having a film thickness of 10 μm was obtained. With regard to the polyimide film thus obtained, a transmittance at a wavelength of 400 nm was 74%, (nx+ny)/2−nz was 0.120, CTE was 11 ppm/K, and a glass transition temperature was 360° C. A result of evaluation of adhesiveness to glass of a polyimide film, which had been obtained with the use of the polyamic acid solution diluted with DMAC to the solid content concentration of 10%, was 3. The result of evaluating the polyimide film is indicated in Table 2.

Example 7

Polymerization of Polyamic Acid

Into a 500 mL glass separable flask equipped with (i) a stirrer having a stainless stirring rod and (ii) a nitrogen inlet tube, 8.3 g of CHDA was introduced. To the CHDA, 170.0 g of DMAC which had been dehydrated was added as an organic solvent for polymerization, and the mixture solution thus obtained was stirred. Subsequently, to the solution, 20.7 g of BPDA and 1.0 g of BPAF were added, and then the mixture solution thus obtained was heated at 100° C. for 5 minutes, then cooled down, then stirred at a room temperature (23° C.) for 5 hours, and a polyamic acid was thus obtained. Ratios of respective added monomers were as follows: i.e., BPDA was 97 mol % and BPAF was 3 mol %, relative to 100 mol % of CHDA. Note that an amount of the diamine compound and the tetracarboxylic dianhydride added to the reaction solution was 15% by weight relative to the entire reaction solution. A weight-average molecular weight (Mw) of the obtained polyamic acid was 50,000.

<Preparation of Polyimide Film>

The polyamic acid solution thus polymerized was diluted with by DMAC to a solid content concentration of 10%, and the solution thus diluted was applied to a glass plate with a bar coater, and was then dried in the air at 60° C. for 30 minutes and in the nitrogen atmosphere at 350° C. for 1 hour. As a result, a polyimide film having a film thickness of 10 μm was obtained. With regard to the polyimide film thus obtained, a transmittance at a wavelength of 400 nm was 77%, $(n_x+n_y)/2-n_z$ was 0.120, CTE was 13 ppm/K, and a glass transition temperature was 360° C. A result of evaluation of adhesiveness to glass of a polyimide film, which had been obtained with the use of the polyamic acid solution diluted with DMAC to the solid content concentration of 10%, was 5. The result of evaluating the polyimide film is indicated in Table 2.

Example 8

Polymerization of Polyamic Acid

Into a 500 mL glass separable flask equipped with (i) a stirrer having a stainless stirring rod and (ii) a nitrogen inlet tube, 8.2 g of CHDA was introduced. To the CHDA, 170.0 g of DMAC which had been dehydrated was added as an organic solvent for polymerization, and the mixture solution thus obtained was stirred. Subsequently, to the solution, 20.1 g of BPDA and 1.7 g of BPAF were added, and then the mixture solution thus obtained was heated at 100° C. for 5 minutes, then cooled down, then stirred at a room temperature (23° C.) for 5 hours, and a polyamic acid was thus obtained. Ratios of respective added monomers were as follows: i.e., BPDA was 95 mol % and BPAF was 5 mol %, relative to 100 mol % of CHDA. Note that an amount of the diamine compound and the tetracarboxylic dianhydride added to the reaction solution was 15% by weight relative to the entire reaction solution. A weight-average molecular weight (Mw) of the obtained polyamic acid was 50,000.

<Preparation of Polyimide Film>

The polyamic acid solution thus polymerized was diluted with DMAC to a solid content concentration of 10%, and the solution thus diluted was applied to a glass plate with a bar coater, and was then dried in the air at 60° C. for 30 minutes and in the nitrogen atmosphere at 350° C. for 1 hour. As a result, a polyimide film having a film thickness of 10 μm was obtained. With regard to the polyimide film thus obtained, a transmittance at a wavelength of 400 nm was 78%, $(n_x+n_y)/2-n_z$ was 0.115, CTE was 15 ppm/K, and a glass transition temperature was 362° C. A result of evaluation of adhesiveness to glass of a polyimide film, which had been obtained with the use of the polyamic acid solution diluted with DMAC to the solid content concentration of 10%, was 5. The result of evaluating the polyimide film is indicated in Table 2.

Comparative Example 1

Polymerization of Polyamic Acid

Into a 500 mL glass separable flask equipped with (i) a stirrer having a stainless stirring rod and (ii) a nitrogen inlet tube, 8.3 g of CHDA was introduced. To the CHDA, 120.0 g of DMAC which had been dehydrated was added as an organic solvent for polymerization, and the mixture solution thus obtained was stirred. Subsequently, to the solution, 21.6 g of BPDA was added, and then the mixture solution thus obtained was heated at 120° C. for 5 minutes, then cooled down, then stirred at a room temperature (23° C.) for 5 hours, and a polyamic acid was thus obtained. Note that an amount of the diamine compound and the tetracarboxylic dianhydride added to the reaction solution was 20% by weight relative to the entire reaction solution. A weight-average molecular weight (Mw) of the obtained polyamic acid was 45,000.

<Preparation of Polyimide Film>

The polyamic acid solution thus polymerized was applied to a glass plate with the use of a bar coater, and was then dried in the air at 60° C. for 30 minutes and in the nitrogen atmosphere at 350° C. for 1 hour. As a result, a polyimide film having a film thickness of 10 μm was obtained. With regard to the polyimide film thus obtained, a transmittance at a wavelength of 400 nm was 70%, $(n_x+n_y)/2-n_z$ was 0.120, CTE was 11 ppm/K, and a glass transition temperature was 360° C. A result of evaluation of adhesiveness to glass of a polyimide film, which had been obtained with the use of the polyamic acid solution thus polymerized, was 2. The result of evaluating the polyimide film is indicated in Table 2.

Comparative Example 2

Polymerization of Polyamic Acid

Into a 500 mL glass separable flask equipped with (i) a stirrer having a stainless stirring rod and (ii) a nitrogen inlet tube, 8.3 g of CHDA was introduced. To the CHDA, 120.0 g of NMP which had been dehydrated was added as an organic solvent for polymerization, and the mixture solution thus obtained was stirred. Subsequently, to the solution, 21.6 g of BPDA was added, and then the mixture solution thus obtained was heated at 120° C. for 5 minutes, then cooled down, then stirred at a room temperature (23° C.) for 5 hours, and a polyamic acid was thus obtained. Note that an amount of the diamine compound and the tetracarboxylic dianhydride added to the reaction solution was 20% by weight relative to the entire reaction solution. A weight-average molecular weight (Mw) of the obtained polyamic acid was 45,000.

<Preparation of Polyimide Film>

The polyamic acid solution thus polymerized was applied to a glass plate with the use of a bar coater, and was then dried in the air at 60° C. for 30 minutes and in the nitrogen atmosphere at 350° C. for 1 hour. As a result, a polyimide film having a film thickness of 10 μm was obtained. With regard to the polyimide film thus obtained, a transmittance at a wavelength of 400 nm was 49%, $(n_x+n_y)/2-n_z$ was 0.160, CTE was 7 ppm/K, and a glass transition temperature was 360° C.

A result of evaluation of adhesiveness to glass of a polyimide film, which had been obtained with the use of the polyamic acid solution thus polymerized, was 2. The result of evaluating the polyimide film is indicated in Table 2.

Comparative Example 3

Polymerization of Polyamic Acid

Into a 500 mL glass separable flask equipped with (i) a stirrer having a stainless stirring rod and (ii) a nitrogen inlet tube, 6.0 g of CHDA was introduced. To the CHDA, 120.0 g of DMAC which had been dehydrated was added as an organic solvent for polymerization, and the mixture solution thus obtained was stirred. Subsequently, to the solution, 24.0 g of BPAF was added, and then the mixture solution thus obtained was stirred at a room temperature (23° C.) for 5 hours, and a polyamic acid was thus obtained. Note that an amount of the diamine compound and the tetracarboxylic dianhydride added to the reaction solution was 20% by weight relative to the entire reaction solution. A weight-average molecular weight (Mw) of the obtained polyamic acid was 62,000.

<Preparation of Polyimide Film>

The polyamic acid solution thus polymerized was applied to a glass plate with the use of a bar coater, and was then dried in the air at 60° C. for 30 minutes and in the nitrogen atmosphere at 350° C. for 1 hour. As a result, a polyimide film having a film thickness of 10 μm was obtained. With regard to the polyimide film thus obtained, a transmittance at a wavelength of 400 nm was 83%, (nx+ny)/2−nz was 0.001, CTE was 52 ppm/K, and a glass transition temperature was 376° C. A result of evaluation of adhesiveness to glass of a polyimide film, which had been obtained with the use of the polyamic acid solution thus polymerized, was 5. The result of evaluating the polyimide film is indicated in Table 2.

Comparative Example 4

Polymerization of Polyamic Acid

Into a 500 mL glass separable flask equipped with (i) a stirrer having a stainless stirring rod and (ii) a nitrogen inlet tube, 13.6 g of 4,4'-diaminodiphenyl ether (hereinafter, sometimes referred to as "4,4'-ODA") was introduced. To the 4,4'-ODA, 120.0 g of DMAC which had been dehydrated was added as an organic solvent for polymerization, and the mixture solution thus obtained was stirred. Subsequently, to the solution, 3.1 g of BPAF and 13.3 g of pyromellitic dianhydride (hereinafter, referred to as "PMDA") were added, and then the mixture solution thus obtained was stirred at a room temperature (23° C.) for 5 hours, and a polyamic acid was thus obtained. Ratios of respective added monomers were as follows: i.e., PMDA was 90 mol % and BPAF was 10 mol %, relative to 100 mol % of 4,4'-ODA. Note that an amount of the diamine compound and the tetracarboxylic dianhydride added to the reaction solution was 20% by weight relative to the entire reaction solution. A weight-average molecular weight (Mw) of the obtained polyamic acid was 50,000.

<Preparation of Polyimide Film>

The polyamic acid solution thus polymerized was applied to a glass plate with the use of a bar coater, and was then dried in the air at 60° C. for 30 minutes and in the nitrogen atmosphere at 350° C. for 1 hour. As a result, a polyimide film having a film thickness of 10 μm was obtained. With regard to the polyimide film thus obtained, a transmittance at a wavelength of 400 nm was 0%, (nx+ny)/2−nz was 0.048, CTE was 41 ppm/K, and a glass transition temperature was 375° C. A result of evaluation of adhesiveness to glass of a polyimide film, which had been obtained with the use of the polyamic acid solution thus polymerized, was 5. The result of evaluating the polyimide film is indicated in Table 2.

Comparative Example 5

Polymerization of Polyamic Acid

Into a 500 mL glass separable flask equipped with (i) a stirrer having a stainless stirring rod and (ii) a nitrogen inlet tube, 1.1 g of p-phenylenediamine (hereinafter, sometimes referred to as "PDA") was introduced. To the PDA, 120.0 g of DMAC which had been dehydrated was added as an organic solvent for polymerization, and the mixture solution thus obtained was stirred. Subsequently, to the solution, 2.2 g of PMDA was added, and then the mixture solution thus obtained was stirred for 1 hour. After that, 11.9 g of 4,4'-ODA was added and stirred, and 9.1 g of PMDA, 4.1 g of BPDA, and 1.6 g of BPAF were further added, and the mixture was stirred at a room temperature (23° C.) for 5 hours. A polyamic acid was thus obtained. Ratios of respective added monomers were as follows: i.e., PMDA was 75 mol %, BPDA was 20 mol %, and BPAF was 5 mol %, relative to 100 mol % of a combination of PDA and 4,4'-ODA. Note that an amount of the diamine compound and the tetracarboxylic dianhydride added to the reaction solution was 20% by weight relative to the entire reaction solution. A weight-average molecular weight (Mw) of the obtained polyamic acid was 50,000.

<Preparation of Polyimide Film>

The polyamic acid solution thus polymerized was applied to a glass plate with the use of a bar coater, and was then dried in the air at 60° C. for 30 minutes and in the nitrogen atmosphere at 350° C. for 1 hour. As a result, a polyimide film having a film thickness of 10 μm was obtained. With regard to the polyimide film thus obtained, a transmittance at a wavelength of 400 nm was 0%, (nx+ny)/2−nz was 0.060, CTE was 36 ppm/K, and a glass transition temperature was 357° C. The result of evaluating the polyimide film is indicated in Table 2.

The polyimides of Examples 1 through 8 achieve (i) higher transparency, i.e., the transmittance over 70% at a wavelength of 400 nm, (ii) better evaluation of adhesiveness to glass, i.e., 3 or more, and (iii) lower birefringence, i.e., (nx+ny)/2−nz<0.120, as compared with the polyimides of Comparative Examples 1, 2, 4, and 5. Moreover, the polyimides of Examples 1 through 8 achieve lower thermal expansion coefficient, i.e., 50 ppm/K or lower, as compared with the polyimide of Comparative Example 3.

INDUSTRIAL APPLICABILITY

According to the polyamic acid, the polyimide, and the polyamic acid solution of the present invention, the polyimide or a polyimide prepared by the use of the polyamic acid (i) has low birefringence in addition to heat resistance, low thermal expansion property, and transparency and (ii) provides good adhesiveness between the support and the polyimide. Therefore, each of the polyamic acid, the polyimide, and the polyamic acid solution of the present invention is expected to be used in a field and a product for which these characteristics are effective. Examples of such a field and a product encompass a printed matter, a color filter, a flexible display, an optical film, a liquid crystal display device, an image display device such as an organic EL and an electronic paper, a 3-D display, a touch panel, a transparent conductive film substrate, and a solar cell. Each of the polyamic acid, the polyimide, and the polyamic acid solution of the present invention is further expected to be used for an alternative material for a part which has conventionally been made of glass.

REFERENCE SIGNS LIST

1: Support
2: Polyamic acid solution

The invention claimed is:

1. A polyamic acid containing a constitutional unit represented by Formula (1) and a constitutional unit represented by Formula (2):

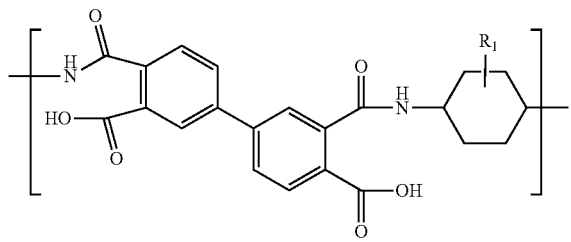

(1)

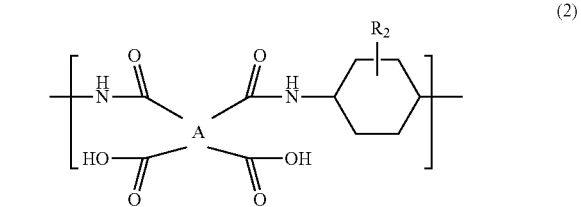

(2)

where, each of "$R_1$" and "$R_2$" is selected from the group consisting of a hydrogen atom, an alkyl group, a halogen atom, a hydroxyl group, a carboxyl group, and an alkoxyl group, "$R_1$" and "$R_2$" are identical with each other or different from each other, and "A" in Formula (2) is an acid dianhydride-derived component selected from the group consisting of a constitutional unit represented by Formula (3), a constitutional unit represented by Formula (4), and a constitutional unit represented by Formula (5):

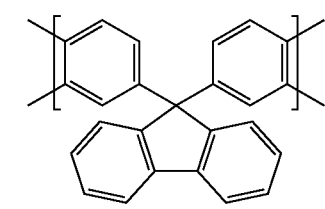

(3)

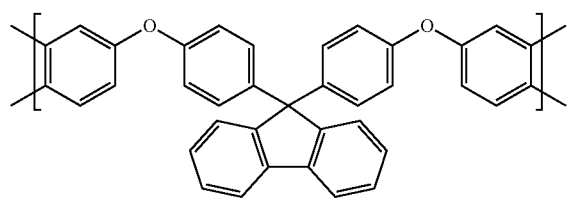

(4)

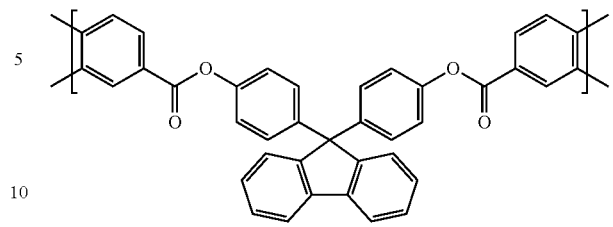

(5)

wherein the molar ratio represented by the number of moles of the constitutional unit represented by Formula (1)/the number of moles of the constitutional unit represented by Formula (2) falls within a range between 60/40 and 99/1.

2. The polyamic acid as set forth in claim 1, wherein the constitutional unit represented by Formula (1) is a constitutional unit represented by Formula (8) below, and the constitutional unit represented by Formula (2) is a constitutional unit represented by Formula (9) below:

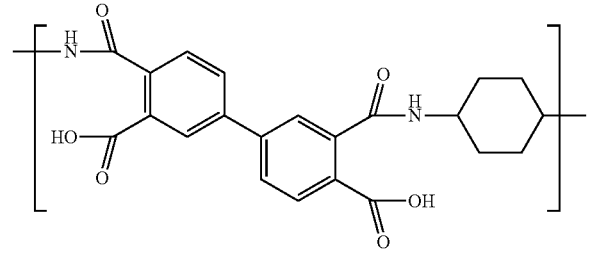

(8)

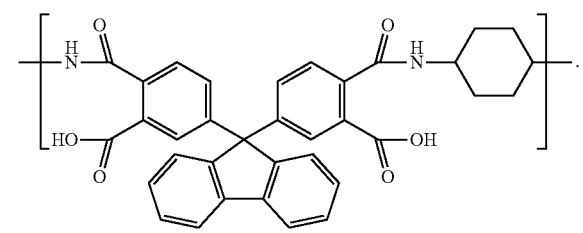

(9)

3. A polyamic acid solution containing a polyamic acid recited in claim 1 and an organic solvent.

4. The polyamic acid solution as set forth in claim 3, wherein the organic solvent contains at least one solvent selected from the group consisting of an amide solvent, a ketone solvent, an ester solvent, and an ether solvent.

5. A polyimide which is obtained by applying a solution comprising a polyamic acid recited in claim 1 to a support and heating the polyamic acid.

6. A polyimide which is obtained by imidizing a polyamic acid recited in claim 1.

7. A polyimide containing a constitutional unit represented by Formula (6) and a constitutional unit represented by Formula (7):

(6)

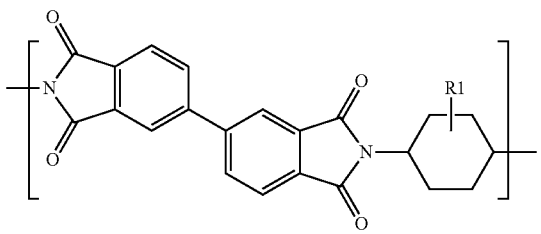

(7)

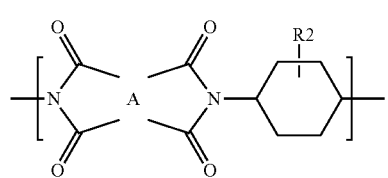

where, each of "R1" and "R2" is selected from the group consisting of a hydrogen atom, an alkyl group, a halogen atom, a hydroxyl group, a carboxyl group, and an alkoxyl group, "R1" and "R2" are identical with each other or different from each other, and "A" in Formula (7) is an acid dianhydride-derived component selected from a group consisting of a constitutional unit represented by Formula (3), a constitutional unit represented by Formula (4), and a constitutional unit represented by Formula (5):

(3)

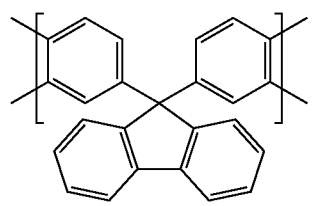

(4)

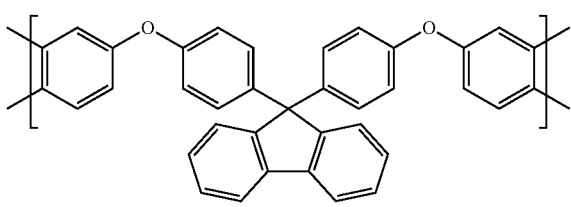

(5)

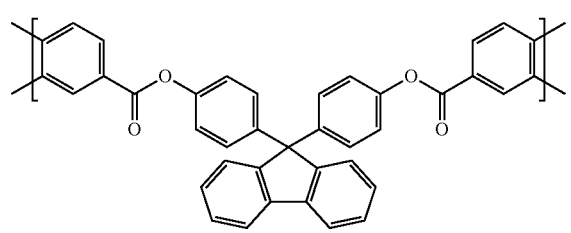

wherein the molar ratio represented by the number of moles of the constitutional unit represented by Formula (6)/the number of moles of the constitutional unit represented by Formula (7) falls within a range between 60/40 and 99/1.

8. The polyimide as set forth in claim 7, wherein the constitutional unit represented by Formula (6) is a constitutional unit represented by Formula (10) below, and the constitutional unit represented by Formula (7) is a constitutional unit represented by Formula (11) below:

(10)

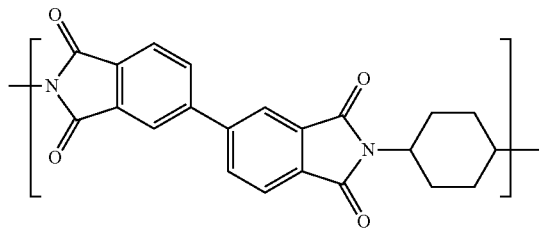

(11)

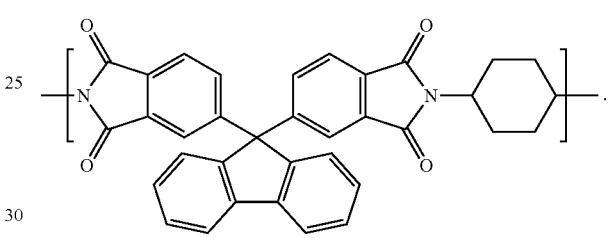

9. The polyimide as set forth in claim 7, wherein the polyimide is provided in the form of a film having an optical transmittance at a wavelength of 400 nm is 50% or higher when a film thickness is 10 μm.

10. The polyimide as set forth in claim 7, wherein the polyimide is provided in the form of a film having a thermal expansion coefficient in a temperature range from 100° C. to 300° C. is 50 ppm/K or lower when a film thickness is 10 μm.

11. The polyimide as set forth in claim 7, wherein the polyimide is provided in the form of a film having properties wherein nx−ny<0.0010 and (nx+ny)/2−nz<0.160 are satisfied, where "nx" is a maximum in-plane refractive index, "ny" is a minimum in-plane refractive index, and "nz" is a refractive index in a thickness direction.

12. The polyimide as set forth in claim 7, wherein the polyimide has a glass transition temperature that is 250° C. or higher.

13. A substrate containing a polyimide recited in claim 7.

14. An optical material containing a polyimide recited in claim 7.

15. An image display device containing a polyimide recited in claim 7.

16. An electronic device material containing a polyimide recited in claim 7.

17. A method of producing a polyimide film comprising the steps of:
   (a) applying a polyamic acid solution to a support; and
   (b) drying the polyamic acid solution with heat after the step (a);
   the polyamic acid solution comprising a polyamic acid and an organic solvent,
   wherein the polyamic acid comprises a constitutional unit represented by Formula (1) and a constitutional unit represented by Formula (2):

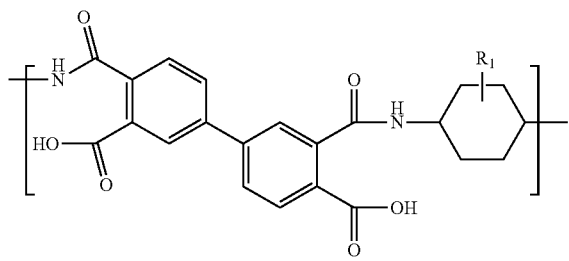
(1)

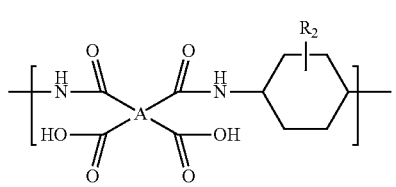
(2)

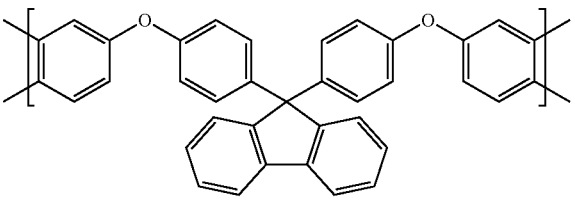
(4)

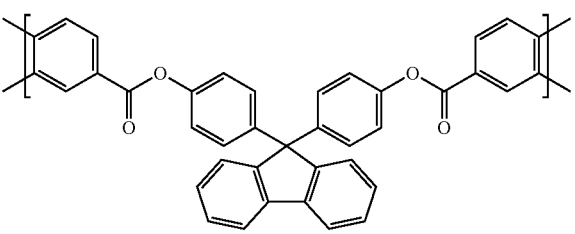
(5)

where each of "$R_1$" and "$R_2$" is selected from the group consisting of a hydrogen atom, an alkyl group, a halogen atom, a hydroxyl group, a carboxyl group, and an alkoxyl group, "$R_1$" and "$R_2$" are identical with each other or different from each other, and "A" in Formula (2) is an acid dianhydride-derived component selected from the group consisting of a constitutional unit represented by Formula (3), a constitutional unit represented by Formula (4), and a constitutional unit represented by Formula (5):

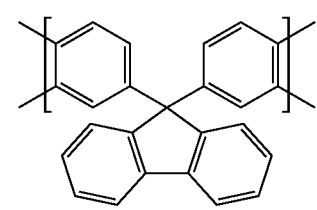
(3)

wherein the molar ratio represented by the number of moles of the constitutional unit represented by Formula (1)/the number of moles of the constitutional unit represented by Formula (2) falls within a range between 60/40 and 99/1.

* * * * *